US008907524B2

(12) United States Patent
Vandor

(10) Patent No.: US 8,907,524 B2
(45) Date of Patent: Dec. 9, 2014

(54) SYSTEMS AND METHODS OF SEMI-CENTRALIZED POWER STORAGE AND POWER PRODUCTION FOR MULTI-DIRECTIONAL SMART GRID AND OTHER APPLICATIONS

(71) Applicant: Expansion Energy, LLC, Tarrytown, NY (US)

(72) Inventor: David Vandor, Tarrytown, NY (US)

(73) Assignee: Expansion Energy LLC, Tarrytown, NY (US)

( * ) Notice: Subject to any disclaimer, the term of this patent is extended or adjusted under 35 U.S.C. 154(b) by 0 days.

(21) Appl. No.: 13/890,917

(22) Filed: May 9, 2013

(65) Prior Publication Data

US 2014/0333139 A1    Nov. 13, 2014

(51) Int. Cl.
*H02J 1/00* (2006.01)
*H02J 3/00* (2006.01)
*H02J 4/00* (2006.01)

(52) U.S. Cl.
CPC .................................. *H02J 4/00* (2013.01)
USPC ........................................................... 307/69

(58) Field of Classification Search
USPC ..................................................... 307/19, 69
See application file for complete search history.

(56) References Cited

U.S. PATENT DOCUMENTS

| | | |
|---|---|---|
| 2,760,356 A | 8/1956 | Sixsmith |
| 3,631,673 A | 1/1972 | Charrier et al. |
| 3,742,716 A | 7/1973 | Backstrom |
| 3,757,517 A | 9/1973 | Rigollot |
| 4,329,842 A | 5/1982 | Hoskinson |
| 4,437,312 A | 3/1984 | Newton et al. |
| 4,455,834 A | 6/1984 | Earle |
| 4,461,154 A | 7/1984 | Allam |
| 4,617,037 A | 10/1986 | Okada et al. |
| 4,617,040 A | 10/1986 | Yoshino |
| 4,715,873 A | 12/1987 | Auvil et al. |
| 4,754,607 A | 7/1988 | Mackay |
| 4,843,828 A | 7/1989 | Gladman |

(Continued)

FOREIGN PATENT DOCUMENTS

| | | |
|---|---|---|
| JP | 63-285273 | 11/1988 |
| JP | 10-238397 | 9/1998 |

(Continued)

OTHER PUBLICATIONS

Vandor, David and Dockter, Jeremy; "The VPS Cycle: A System and Method of Power Storage and Release". Report, dated Oct. 2008.

(Continued)

*Primary Examiner* — Carlos Amaya
(74) *Attorney, Agent, or Firm* — Eric L. Lane; Green Patent Law

(57) ABSTRACT

Systems and methods of semi-centralized power storage and distributed power generation comprise at least one power storage facility at a first location, at least one distributed power generation facility at a second location different than the first location, and at least one mobile stored power transportation unit. The power storage facility includes a power storage medium comprising liquid air, nitrogen, oxygen, or a combination thereof. The mobile stored power transportation unit is configured to carry at least a portion of the power storage medium to the distributed power generation facility. In exemplary embodiments, the power storage facility is an air separation plant. The power storage facility may also function as an energy service company.

27 Claims, 6 Drawing Sheets

(56) References Cited

U.S. PATENT DOCUMENTS

| | | |
|---|---|---|
| 5,123,946 A | 6/1992 | Ha |
| 5,251,450 A | 10/1993 | Agrawal et al. |
| 5,384,489 A | 1/1995 | Bellac |
| 5,495,709 A | 3/1996 | Frutschi |
| 5,507,148 A | 4/1996 | Mostello |
| 5,537,822 A | 7/1996 | Shnaid et al. |
| 5,582,035 A | 12/1996 | Rathbone et al. |
| 5,626,019 A | 5/1997 | Shimizu et al. |
| 5,660,059 A | 8/1997 | Higginbotham |
| 5,666,823 A | 9/1997 | Smith et al. |
| 5,715,706 A | 2/1998 | Rathbone |
| 5,907,959 A | 6/1999 | Agrawal et al. |
| 5,941,098 A | 8/1999 | Guillard et al. |
| 6,155,078 A | 12/2000 | Miyashita et al. |
| 6,230,518 B1 | 5/2001 | Hahn et al. |
| 6,244,072 B1 | 6/2001 | Rathbone |
| 6,293,126 B1 | 9/2001 | Higginbotham |
| 6,389,814 B2 | 5/2002 | Viteri et al. |
| 6,920,759 B2 | 7/2005 | Wakana et al. |
| 7,043,920 B2 | 5/2006 | Viteri et al. |
| 7,250,691 B2 | 7/2007 | Enis et al. |
| 7,464,557 B2 | 12/2008 | Vandor et al. |
| 7,821,158 B2 | 10/2010 | Vandor |
| 7,870,746 B2 | 1/2011 | Vandor |
| 8,020,404 B2 | 9/2011 | Vandor |
| 8,063,511 B2 | 11/2011 | Vandor |
| 2001/0004830 A1 | 6/2001 | Wakana et al. |
| 2003/0101728 A1 | 6/2003 | Wakana et al. |
| 2005/0076639 A1 | 4/2005 | Shirk et al. |
| 2005/0198961 A1 | 9/2005 | Shirk et al. |
| 2006/0005739 A1* | 1/2006 | Kumar ............................ 105/35 |
| 2006/0254287 A1 | 11/2006 | Greenberg et al. |
| 2006/0260312 A1 | 11/2006 | Ingersoll |
| 2007/0186563 A1 | 8/2007 | Vandor et al. |
| 2008/0047271 A1 | 2/2008 | Ingersoll |
| 2008/0216510 A1 | 9/2008 | Vandor et al. |
| 2009/0113928 A1 | 5/2009 | Vandor et al. |
| 2009/0226308 A1 | 9/2009 | Vandor |
| 2009/0282840 A1 | 11/2009 | Chen et al. |
| 2009/0293502 A1 | 12/2009 | Vandor |
| 2009/0293503 A1 | 12/2009 | Vandor |
| 2010/0084256 A1 | 4/2010 | Vandor |

FOREIGN PATENT DOCUMENTS

| | | |
|---|---|---|
| JP | 2001-090509 | 4/2001 |
| JP | 2001-193483 | 7/2001 |
| JP | 2002-339760 | 11/2002 |
| KR | 1993-0003211 | 4/1993 |
| WO | 2007096656 | 8/2007 |
| WO | 2008052809 A1 | 5/2008 |
| WO | WO 2012/095636 A2 | 7/2012 |

OTHER PUBLICATIONS

Vandor, David and Dockter, Jeremy; "Efficiency of Expansion Energy's "VSP Cycle" Utility-Scale Power Storage System", Article, dated Aug. 8, 2008.

Vandor, David and Dockter, Jeremy, U.S. "Utility-Scale Storage System", Article, dated Jul. 21, 2008.

Chino, K. and Araki, H., "Evaluation of Energy Storage Method Using Liquid Air", abstract of journal, dated 1999.

International Preliminary Report on Patentability for related International Application No. PCT/US2011/056213.

Hidefumi Araki et al., "Simulation of heat Transfer in the Cool Storage Unit of a Liquid-Air Energy Storage System", Heat Transfer—Asian Research, John Wiley & Sons, Inc., vol. 31, No. 4, May 24, 2002, pp. 284-296, United States.

Office Action issued in related Canadian Patent Application No. 2,755,930, dated Feb. 13, 2012.

Office Action issued in related Korean Patent Application No. 10-2011-7022618, dated Apr. 6, 2013.

Office Action issued in related Australian Patent Application No. 2011318385, dated May 15, 2013.

International Search Report and International Preliminary Report on Patentability for related International Application No. PCT/US2010/027219.

International Search Report and International Preliminary Report on Patentability for related International Application No. PCT/US2009/041157.

Office Action dated Apr. 23, 2014 issued by the European Patent Office in European Patent Application No. 10 756 580.6.

\* cited by examiner

SYSTEMS AND METHODS OF SEMI-CENTRALIZED POWER STORAGE AND POWER PRODUCTION FOR MULTI-DIRECTIONAL SMART GRID AND OTHER APPLICATIONS

FIELD

The present disclosure relates to systems and methods of semi-centralized power storage and distributed power generation, as well as methods of enhancing the integration of the electric grid and gas pipeline systems.

BACKGROUND

Storage of electric power allows low-value power produced "off-peak" (e.g., overnight) to be released during "peak" power demand periods (e.g., daytime) when the value of power is substantially higher and when power shortages are most likely to occur. This is true regardless of the source (e.g., coal-fired power, nuclear power, wind power, etc.) of the "original" power to be stored. Numerous important benefits result from multi-megawatt ("bulk") power storage methods, including using off-peak energy to provide more peak power, expanding the amount of higher-value peak power that can be delivered through existing transmission and distribution infrastructure, and transforming intermittent (unreliable) power sources such as wind and solar into "firm," "dispatchable" (reliable) sources.

Generally, electrical grids can only tolerate+/−10% intermittent renewable power as a percentage of the total power supply on the grid, because allowing significantly more intermittent power would cause the grid to become unstable/unreliable and may "crowd-out" the more reliable (and thus more valuable) power from baseload plants. This represents a "ceiling" for the market penetration of intermittent renewable power sources in the absence of a cost-effective, broadly deployable bulk power storage solutions such as the disclosed embodiments. In addition, smaller multi-megawatt energy storage systems (e.g., 1 MW to 50 MW) provide a means to add peak power capacity to constrained load pockets at high net efficiency while helping to upgrade (and, in effect, expand) power distribution systems, especially in areas where few other options exist and/or where upgrades are costly.

There are many benefits of bulk power storage to the electrical grid, including but not limited to the ability to buy electric energy low (off-peak) and sell high (peak), greater electric supply capacity, elimination of the need for "peaker" power plants, reduction of transmission capacity requirements and congestion, better electric service reliability and power quality, reduction in electric bills, and firming of renewables capacity. Not all of the above power storage values apply for each deployment of a storage asset, because the individual values that can be garnered are case-specific. However, as a general rule, the closer the power "release" of a power storage system is to the load, the more benefit it will bring to the overall electrical grid, including but not limited to, utilities, ISOs and rate-payers. Thus, systems such as the disclosed embodiments whose power release can occur close to the power load are more valuable than those that can only be deployed far "upstream" on the grid.

Despite the many advantages of bulk power storage identified above, there are very few market-ready power storage options in the lower commercial scale range, e.g., 1 MW to 50 MW. Battery technologies are generally limited to a few MW/MWH of capacity (under 5 MW/10 MWH per day) and have other drawbacks including disposal issues at the end of the life of the batteries and limited discharge durations (generally less than 2 hours per day). There are several available methods for large, utility-scale (greater than 100 MW) power storage, including Compressed Air Energy Storage (CAES), pumped hydro, and liquid air energy storage (LAES) such as Vandor's Power Storage (VPS) Cycle. CAES is severely limited by the need for caverns and/or other underground geological formations that are required to contain the compressed air. Also, CAES does not deliver a consistent amount of power output; rather, the amount of power generated declines with each hour of power release, as the pressure of the compressed air in the cavern decreases throughout the daily cycle. Pumped hydro is also limited by geography and geology, requiring two large "lakes" to be separated by a significant height differential between the two reservoirs, with a dam and water-turbines between them.

VPS is much more flexible because it is not constrained by geography/geology and can be placed near the end user of the power, i.e., at the load, thus enhancing the deployment's value. However, in order to increase the total number of possible deployment sites, the basic principles of VPS, and the methods and systems embodied in the previous patents, need to be enhanced to allow for the technology to be deployable not only at utility scales, (which can be characterized as approximately 50 MW/400 MWH and larger), but also at smaller, "commercial scales," which will typically be as small as about 1 MW, but could be even smaller, i.e., in the kW scale. A network of widely deployed, smaller-than utility-scale, power storage facilities will constitute a "distributed power storage" system. Such a system offers many benefits, including flexibility as to how the inflow to storage occurs on the grid and as to how the outflow from storage is sent out to power users.

The various pumped hydro, and the two CAES deployments now operating worldwide, are the largest-scale examples of power storage, where each deployment can send out hundreds of megawatts of power. At the other end of the scale, proposals have been put forth for using the power storage capacity of the batteries in all-electric cars as a "crowd source" distributed power network where each car provides only a few kW of power output (when it is plugged in to a two-way connection to the grid), but where the cumulative effect of many such plugged in cars may be significant. Thus, there is a need for an energy storage system that fits within the gap that exists between those two extremes, and which gap is not now served by commercially viable technologies.

In addition to the power storage issues outlined briefly above, the power distribution network faces another set of related challenges that are best solved by "distributed power generation" systems and methods. For example, if the power distribution network is to be more reliable, it needs to be restructured. In particular, there is a need for an energy production and distribution system that relies less on large-scale, centralized power plants located far from their customers, where an increasingly congested and vulnerable (to natural and man-made events) grid connects large generating facilities with a customer base. Instead, there is a need for power generation that can be employed at lower capital cost and more locally, near customers, providing for redundancy, shorter travel times/distances on the grid (reducing line losses and congestion), and allowing for more competition in the market and at a pricing structure that reflects the multiple options for localized (distributed) power production. The smaller the economic and technical "threshold" for distributed power production systems the more widely they can be deployed, the more "distributed" the deployments, the more such a network can avoid grid congestion, and the less vulnerable the grid becomes to unplanned natural and man-made outages i.e., by relying on numerous widespread generation sources instead of just one (or several) large, centralized power plants).

Accordingly, there is a need for power storage systems and methods, which can transform low-value, off-peak power into high-value peak power and which can make intermittent power sources "firm." There is a further need for power storage and distributed generation systems and methods that can be widely deployed at smaller commercial scales. Finally, There is also a need for power storage and distributed generation systems and methods, which can be located close to power consumers (i.e., load centers).

SUMMARY

The embodiments of the present disclosure alleviate to a great extent the disadvantages of known utility-scale power storage systems and power production systems by using Liquid Air (L-Air), liquid oxygen and/or liquid nitrogen and/or some combination thereof ($O_2/N_2$ from this point forward) as working fluids that can be produced during off-peak periods, transported in trailers and rail cars, and stored in aboveground, low- to moderate-pressure, cryogenic storage tanks, for release during peak power demand periods, but at scales and in configurations that allow for commercial-scale storage and power generation (i.e., release) deployments, and allow the storage components to be located independently of the power generation (release) components. Disclosed embodiments can provide distributed power storage from as low as kW scale or approximately 1 MW (referred to herein as "commercial-scale" or "Commercial-Scale" VPS) to utility-scales, which can be defined, as above, as 50 MW or larger.

Fundamentally, embodiments of the present disclosure convert inflow-to-storage electric power into liquid air (L-Air) or into liquid oxygen or liquid nitrogen, which are components of air. Air is abundant, free, and non-toxic, so any "leaks" will not harm the environment. The other components of air, such as carbon dioxide, argon, neon, helium, krypton and xenon have value and are recoverable during the $O_2/N_2$ production process. As such, the air that is processed for embodiments of the present disclosure will yield valuable byproducts.

Disclosed embodiments allow for the widespread integration of the electric grid with other fuel sources such as the natural gas pipeline network, making every site that has access to both distribution systems a potential power storage facility, a potential distributed power generating facility, or both a power storage and a power generating facility. That integration of those two widely deployed networks—the electric grid and the gas pipeline system—has, to date, only been possible at selected sites where large-scale gas-fired power plants or simple-cycle gas turbines ("peak shaving" or "peaker" plants) are deployed. Without embodiments of the present disclosure, the vast majority of customers for electric power and natural gas cannot optimally "connect" the two "delivery systems" they have access to, and do not have options for localized power storage or for cost-effective distributed power production, and certainly have no options for achieving both.

In addition to "stand-alone" commercial-scale VPS plants, embodiments of the disclosure allow for the integration of VPS technology with existing simple-cycle gas-fired power plants (e.g., "peakers"). In other words, existing simple-cycle power plants can be retrofitted with VPS technology to convert them into "daily duty" baseload power storage and dispensing assets—making them far more valuable assets than the occasionally-used peakers that they are today. Hundreds of such peakers exist around the world, representing a large market opportunity for the deployment of disclosed systems, advancing the goals of distributed power storage and distributed power generation. Disclosed embodiments could eliminate the need for simple-cycle peaker plants entirely, including by retrofitting existing peakers.

Embodiments of the present disclosure are generally smaller, simpler and lower-cost than the previously patented versions of VPS, and address an even broader and larger market opportunity/need. Disclosed embodiments can be modular, standardized, factory-built "appliances" at scales of 1 MW to 20 MW (or more)—scales where today there is virtually no cost-effective technological solution, as such scales are generally too small for CAES and pumped hydro and too large for battery storage.

Embodiments of the present disclosure represent a potential "paradigm shift" in how energy is produced, delivered, stored and used, and as such is a (beneficially) "disruptive" technology. Worldwide, virtually every facility that uses about 1 MW or more of power from the electric grid and is served by a natural gas grid connection (or other source of natural gas) is a candidate site for the disclosed embodiments. Each such deployment could eventually become part of a widespread network of cost-effective, low-emissions semi-centralized storage and distributed generation assets, combining the well-recognized economic and operational benefits of power storage and distributed generation—two of the most important trends in the power industry today.

An additional element of the potential paradigm shift that the disclosed embodiments provide is the opportunity for whole new business models, including but not limited to "merchant" power-storage/power-delivery businesses, operating similar to energy services companies (ESCOs). Such merchants could produce the stored power at their own (or others') cryogenic plants, and sell/transport that stored power to distributed power generators and/or power consumers, as described in other sections herein. Thus, perhaps for the first time, through the disclosed embodiments, "merchants" in the power industry could not only supply power generation (and occasionally power storage) as they do today, but they could also provide power distribution (similar to the function of utilities).

A further potential new system, method and business model would be a "de-linked" (both physically and economically) power storage and delivery system, whereby power is stored in one location (usually on the electrical grid) and sold/transported to one or more other locations without using/requiring an electrical grid (or even an electrical distribution line) to reach the power to that destination point. As such, disclosed embodiments would also allow a whole new saleable/tradable commodity (stored power) to emerge in the energy industry. Such stored energy would not be limited to just one or a few suppliers or customers (as electricity generally is today) because the disclosed embodiments do not rely on the "fixed" electrical grid to reach its point of use. Further, the disclosed embodiments would yield a substantially more nimble and flexible electrical system.

Power storage assets have historically relied on a single connection to a source of electricity to function. That presents challenges in terms of reliability of power supply (reliance on a single source) and in terms of pricing (little or no competition of supply due to the need to receive power from a single grid connection). Disclosed embodiments "break that mold" by allowing stored power to be delivered (in the form of a mobile (e.g., truckable) cryogenic fluid) from many sources of supply (e.g., multiple suppliers of L-Air, $O_2$ or $N_2$), bringing the power storage and power generation market substantially closer to what economists call a "perfect market" (i.e., many suppliers and many customers, each having choice), benefiting the whole electrical system and the rate-payers. This reduces the need for the "natural monopolies" (i.e., regulated utilities) that have controlled the grid's power supply and distribution for many decades, allowing for a more de-regulated, "market-based" power industry. Similarly, disclosed embodiments will reduce the need for large, centralized (often distantly located) power plants, which are very expensive to construct, and often require high-capacity/high-voltage interstate/intrastate transmission lines, which are difficult to permit and construct. Thus, through disclosed embodiments, power markets can be reliably "localized," yielding numerous significant benefits.

Because of the disclosed embodiments' wide range of scales and their inherent flexibility as described herein (e.g., the mobility of the power storage units), disclosed embodiments are suitable for a wide variety of potential deployment sites/end-users, including but not limited to, the following:

Industrial facilities/factories/refineries
Microgrids
Utility—T&D "tight spots"/capacity upgrades
Military bases
Hospitals
Office parks/corporate campuses
Shopping centers
Airports & shipping ports
Wind farms & solar farms
University campuses
Data centers/server farms
Food processing/refrigerated warehouses
Mines & quarries
Other critical buildings/infrastructure Because embodiments of the present disclosure allow surplus power generated at the distributed power production site (above the amount of power needed by the host site) to be sold to the grid (either by the host/asset owner or by a third-party ESCO or power broker/trader), disclosed embodiments include a significant enabling technology to advance the development/utilization of a multi-directional "smart grid," which power utilities and power systems manufacturers have promoted in recent years. An optimal smart grid needs power sourced from many locations, and flowing in multiple directions, which can change quickly based on supply and demand conditions. Owners/users of disclosed embodiments would be not only power consumers, but also power providers.

This allows many more power suppliers to enter the market for electricity supply, "democratizing" the market by reducing/eliminating the historical reliance on a single (or a few) large power generators/utilities. This is particularly true because disclosed embodiments are deployable at relatively small scales (e.g., as low as kW scale and approximately 1 MW), reducing "barriers-to-entry" by making it easier and less expensive for many parties to purchase/own/lease power storage and generation assets. Thus, competition in the power supply market would be increased (a major goal of utility regulators and policy makers in recent decades) through the widespread deployment of disclosed embodiments, thereby benefiting power consumers/rate-payers, including by keeping power prices low. Additionally, independent system operators (ISOs) who manage the grid would benefit from having additional, more distributed sources of power supply to rely upon in order to "balance" the market and ensure that power is available when and where needed. It should be noted that each distributed power production site envisioned by the present disclosure may also receive "power" from more than one supplier, further providing "certainty" and competition.

Exemplary systems of semi-centralized power storage and distributed power generation comprise at least one power storage facility at a first location, at least one distributed power generation facility at a second location different than the first location, and at least one mobile stored power transportation unit. The power storage facility includes a power storage medium comprising liquid air, nitrogen, oxygen, or a combination thereof. The mobile stored power transportation unit is configured to carry at least a portion of the power storage medium to the distributed power generation facility. In exemplary embodiments, the power storage facility is an air separation plant. In exemplary embodiments, the power storage facility functions as an energy service company, also known as an ESCO. Exemplary embodiments may further comprise at least one power storage facility at a third location, wherein at least one mobile stored power transportation unit transports power storage medium from the third location to the distributed power generation facility In exemplary embodiments, the distributed power generation facility is electrically connected to an electric grid and provides power to the grid, which could be surplus power (beyond the needs of the adjacent power consumer(s)) to the grid. Exemplary systems may further comprise at least one power producer providing power to the power storage facility. The power storage facility may be configured to use a portion of the stored power in a distributed power generation mode. A natural gas pipeline and a prime mover, such as a turbine or an engine, may be provided with the power storage facility to enable it to use the power. Exemplary embodiments include a natural gas pipeline fluidly connected to the distributed power generation facility.

In exemplary embodiments, the power storage facility comprises a plurality of compressors, at least one heat exchanger fluidly connected to at least one of the compressors, at least one expander fluidly connected to at least one of the compressors, a mechanical chiller fluidly connected to the expander, and a storage vessel fluidly connected to the expander. An exemplary distributed power generation facility may comprise a plurality of heat exchangers, at least one expander fluidly connected to at least one of the heat exchangers, and a prime mover assembly including a prime mover. The prime mover assembly may be fluidly connected to at least one of the heat exchangers.

Exemplary embodiments may further comprise a prime mover fluidly connected to the distributed power generation facility, wherein the prime mover functions as a back-up generator. In exemplary embodiments, semi-centralized power storage and distributed power generation systems further comprise a mobile vehicle including a prime mover, the prime mover being fluidly connected to the distributed power generation facility. The prime mover may be a fueled turbine that provides a portion of the power supplied by the distributed power generation facility. The prime mover may be a fueled turbine, and the power storage medium cools inlet air stream to the turbine. The system may be a commercial scale deployment. In exemplary embodiments, the system comprises at least one power storage facility at a third location different than the first location, wherein at least one mobile stored power transportation unit transports power storage medium from the third location to the distributed power generation facility. The at least one mobile stored power transportation may carry at least a portion of the power storage medium off-grid to the distributed power generation facility Exemplary embodiments include a method of semi-centrally storing energy and distributing power comprising storing power at a first location in a power storage medium, transporting at least a portion of the power storage medium to a second location different than the first location, and releasing power from the power storage medium to generate power at the second location. The power storage medium comprises liquid air, nitrogen, oxygen, or a combination thereof. In exemplary embodiments, storing power comprises separating air into oxygen, nitrogen, or a combination thereof. The step of storing power may also comprise providing a stream of side load refrigerant to cool the power storage medium. Exemplary methods may further comprise storing at least a portion of the power in the power storage medium as back-up power.

The step of generating power may include providing power, which could be surplus power (beyond the power consumption of the adjacent power user(s)), to an electric grid. In exemplary embodiments, a portion of the stored power is used at the first location. Exemplary methods may further comprise providing natural gas at the second location. In exemplary methods, releasing power comprises pumping to pressure the power storage medium, directing a working fluid in counterflow to the power storage medium such that the working fluid warms the power storage medium and the power storage medium condenses the working fluid, directing one or more gaseous products of combustion in counterflow to the pumped-to-pressure power storage medium and to the pumped to pressure working fluid, such that the gaseous products warm the two pumped to pressure fluids, and expanding those fluids in generator-loaded expanders.

In exemplary embodiments, an integrated electric grid, fuel source, and surface system is provided comprising at least one power storage facility at a first location, at least one distributed power generation facility at a second location different than the first location, at least one mobile power storage unit, and a fuel source in fluid communication with the distributed power generation facility. In exemplary embodiments, the fuel source is a natural gas pipeline, but it could be any fuel source. The power storage facility includes a power storage medium comprising liquid air, nitrogen, oxygen, or a combination thereof, and the mobile stored power transportation unit is configured to carry at least a portion of the power storage medium to the distributed power generation facility via surface transport systems. The distributed power generation facility may be electrically connected to an electric grid. In exemplary embodiments, the power storage facility is an air separation plant. The power storage facility may be configured to use a portion of the stored power in a distributed power generation mode.

Exemplary embodiments include a method of engaging in a power exchange transaction comprising storing power in a first location in a power storage medium, transporting at least a portion of the power storage medium to a second location different than the first location, and exchanging at least a portion of the power stored in the power storage medium. Exemplary embodiments include method of distributing power comprising transporting power from a first location to a second location in a power storage medium via a mode of transportation independent of an electricity grid.

Advantageously, embodiments of the present disclosure eliminate the need for an absorption chiller to recover heat-of-compression to produce low-grade refrigeration, which in other embodiments of VPS cooled the air streams prior to each stage of compression. This innovation reduces the cost, size and weight of the inflow-to-storage equipment. In lieu of an absorption chiller, exemplary embodiments use a "side load" of low-grade refrigeration, which can be provided by the mechanical chiller that also provides the deep refrigeration to the compressed air, prior to the air's expansion in a compressor-loaded turbo expander. The side load is virtually "free" refrigeration, in that it is "surplus" (low-grade refrigeration) that is a normal byproduct of the mechanical chiller, where the main purpose of that mechanical chiller is to provide deep refrigeration to the air liquefaction cycle and where the size and power demand of that mechanical chiller need not be significantly increased in order to accommodate the low-grade refrigeration side load. In this context, "side load" can also include any recoverable low-grade refrigeration that may be available from the air separation plant (or other facility) that is adjacent to (or hosting) the power storage equipment.

Exemplary embodiments include methods of storing mechanical energy comprising compressing a power storage medium, providing side load and/or main load (deep) refrigerant to cool the power storage medium, and separating the power storage medium into a product stream, e.g., $O_2$ or $N_2$ and a recycle stream. The power storage medium can be air, or separated constituents of air such as nitrogen, oxygen, or a combination of nitrogen and oxygen. The recycle stream is directed such that it combines with and is cooled by a stream of side load refrigerant and forms a refrigerant/recycle stream. The refrigerant/recycle stream is directed in a first direction and the product stream is directed in a second direction in counterflow to the refrigerant/recycle stream such that the product stream is cooled by the refrigerant/recycle stream. The cooled product stream can then be stored in a dense phase, such as a liquid. Additional steps could include removing moisture and carbon dioxide from the energy storage medium before liquefaction.

In exemplary embodiments, a method of releasing stored power comprises pumping to pressure a power storage medium, performing certain heat exchange steps, and expanding the power storage medium. The power storage medium can be air, or separated constituents of air such as nitrogen, oxygen, or a combination of nitrogen and oxygen. An exemplary heat exchange step could be directing working fluid in counterflow to the power storage medium such that the working fluid warms the power storage medium and the power storage medium condenses the working fluid. The working fluid could be condensed and pumped to pressure, heated and sent to a generator-loaded hot gas expander, all within a closed loop. Another exemplary heat exchange step could be directing the power storage medium in a first direction and directing hot air in a second direction in counterflow to the power storage medium such that the hot air warms the power storage medium. Another exemplary heat exchange step could be directing combustion gas in counterflow to the power storage medium such that the combustion gas warms the power storage medium.

Advantageously, exemplary embodiments include the use of one or more generator-loaded gas turbines (GTs), which can provide the waste heat used to release the mechanical energy in the pumped-to-pressure L-Air or constituents of air. By substituting a single GT for a combustion chamber, embodiments of the present disclosure can comfortably utilize the (cooler) approximately 1,100° F. outflow stream from the GT. For example, a single GT, with a maximum 2.25 MW of output (achievable with cold inlet air), allows for the cost-effective and highly efficient deployment of Commercial-Scale VPS units with about 14.4 MW/115 MWH of output. Thus, exemplary embodiments further comprise directing gaseous products of combustion, such as exhaust, from a prime mover such as a gas turbine in counterflow to the power storage medium such that the exhaust warms the power storage medium.

Exemplary embodiments further comprise matching an inlet air-flow rate of the prime mover to a selected storage capacity for the L-Air (or other power storage medium described herein). Exemplary embodiments further comprise matching a first level of refrigeration content of the air to a second level of refrigeration content necessary to condense a counterflowing working fluid, recovering much of the cold contained in the storage medium. The gaseous products of combustion such as exhaust could be reheated such that the resulting heat matches the inlet air's flow rate and a flow rate of the cold recovery working fluid. More particularly, the amount of heat provided by the GT and possibly supplemented with heat produced in an after-burner or supplemental heater, could be matched to the amount of L-Air stored during the nighttime inflow-to-storage mode and matched to the flow rate of the working fluid in the secondary heat recovery loop of the outflow-from-storage mode. In exemplary embodiments, pumped to pressure L-Air is matched to the flow rate of the working fluid, such that the expanded working fluid is condensed by the outbound L-Air, ready for pumping to pressure, heated by a portion of the heat in the GT exhaust.

The inlet air-flow rate to the prime mover could be matched to a flow rate of the liquid oxygen, liquid nitrogen, or combination thereof such that the cold oxygen/nitrogen cool the inlet air to below ambient temperatures, making that inlet air denser and improving the efficiency of the GT. Exemplary embodiments further comprise matching a first level of refrigeration content of the liquid oxygen, liquid nitrogen, or combination thereof to a second level of refrigeration content necessary to condense the working fluid. Exemplary embodiments further comprise reheating the exhaust such that the resulting heat matches the inlet air flow rate and a flow rate of working fluid. Exemplary embodiments further comprise introducing methanol into the inlet air flowing into the prime mover when that inlet air is cooled to less than 32° F. by the cold oxygen/nitrogen and/or by the cold working fluid.

In exemplary embodiments, a power storage system comprises a plurality of compressors, at least one heat exchanger fluidly connected to at least one of the compressors, at least one expander fluidly connected to at least one of the compressors, a mechanical chiller fluidly connected to an expander, at least one valve, and a storage vessel fluidly connected to an expander. The compressors providing a plurality of compression stages to a power storage medium, which could be air or constituents of air such as nitrogen, oxygen, or a combination of nitrogen and oxygen. The mechanical chiller provides a main load (deep refrigeration) and/or a side load of low-grade refrigeration to the power storage medium. The valve separates the power storage medium into a product stream and a recycle stream. The heat exchanger facilitates heat exchange between the refrigerant/recycle stream and the product stream such that the product stream is cooled by the refrigerant/recycle stream. A clean-up assembly will remove the moisture and carbon dioxide in the inlet air to avoid freezing, and will be fluidly connected to at least one of the compressors.

Exemplary embodiments include systems of power release and cold recovery comprising a storage vessel, a pump fluidly connected to the storage vessel, a plurality of heat exchangers fluidly connected to the pump, at least one expander fluidly connected to at least one of the heat exchangers and a prime mover assembly including a prime mover, the prime mover assembly fluidly connected to at least one of the heat exchangers. The heat exchangers facilitate heat exchange between a power storage medium and hot products of combustion such that the hot exhaust warms the power storage medium and the working fluid. In exemplary embodiments, the prime mover is a gas turbine.

Accordingly, it is seen that systems and methods of semi-centralized power storage and distributed generation are provided. Disclosed systems and methods provide power storage in a medium comprising L-Air, oxygen, nitrogen, or a combination thereof which can be transported to distributed sites for release of power during peak power demand periods (or other periods when power is needed). The disclosed systems and methods further enable integration of the utility grid and other fuel sources such as gas pipelines so that customers for electric power and natural gas can optimally take advantage of these two energy delivery systems. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

Figure 1A:
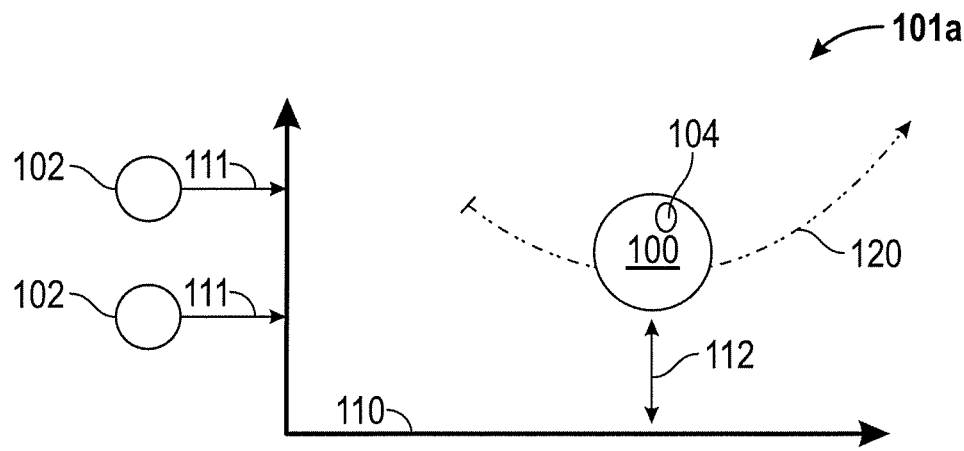
FIG. 1A is a box diagram of an exemplary embodiment of a semi-centralized power storage and power generation system and method in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

In general, embodiments of the present disclosure are significant for several reasons. First, they provide alternatives to compressed air and liquid air storage media. Disclosed embodiments can function with liquid air, even at smaller, commercial-scales, but can also use liquid $O_2$ or liquid $N_2$ as the energy storage fluid. This offers opportunities to integrate embodiments of the disclosure with existing and future equipment at air separation plants and allows those plants to more fully utilize $O_2/N_2$ that is made as byproduct of the other gas/liquid produced, which has an existing customer base, but where that byproduct is of low-value.

As described in more detail herein, in exemplary embodiments the $O_2/N_2$ would be pumped to pressure by a cryogenic liquid pump, its cold content recovered by heat exchange with a working fluid loop (where the refrigeration content of the $O_2/N_2$ would condense/liquefy the working fluid) and where the hot exhaust gas from a gas turbine (GT), or from a gas-fired engine, would heat the pumped to pressure $O_2/N_2$ and working fluid streams, which would be expanded in generator-loaded hot gas expanders. The $O_2/N_2$ would be vented to the atmosphere (without harmful emissions), and replaced the next night, and the working fluid would be contained in its own closed loop, which would be dormant during the off-peak (nighttime) hours.

Exemplary embodiments allow the inflow to storage mode to occur such that an existing or newly constructed air separation plant is the recipient of that off-peak power, where that power is converted to $O_2/N_2$, and where the higher-value product is sold to existing or newly established markets/customers and where the lower-value product is used as the energy storage and release medium. In such embodiments the air separation plant or other power storage facility uses disclosed embodiments at a commercial scale, likely fully using all of the available power output during the daily peak period but achieving significant capital cost savings (versus building a full commercial-scale VPS Cycle plant "from scratch") because the inflow-to-storage mode is largely in place.

If $O_2/N_2$ is the storage medium, then any remaining low-grade refrigeration can be transferred (via heat exchangers) to the inlet air that would normally be drawn in by the GT, where, for example, −4° F. air is sent to the GT's inlet air nozzle. That approximately −4° F. inlet air can be the last stop of the stored L-Air during the outflow mode, if that is the medium of storage. That chilled inlet air could also receive an "infusion" of methanol (or other such "anti-freeze" fluid), such that the cold air's water content would not freeze and the anti-freeze fluid would combust, along with the air plus fuel in the GT. Absent embodiments of the present disclosure, the deliberate production of such refrigeration to improve GT performance would not be cost-effective.

Thus, disclosed systems and methods provide several major advantages. First, they advantageously eliminate reliance on L-Air as the storage medium in favor or liquid $O_2/N_2$ storage, especially if that liquid $O_2/N_2$ production unit is part of an air separation plant, where the existing equipment would allow the VPS deployment to avoid constructing the entire "inflow-to-storage" portion of the VPS Cycle. Only the outflow-from-storage mode would need to be added to the air separation plant. In other words, exemplary embodiments allow each existing air separation plant to become a cost-effective commercial-scale power storage and power production facility.

Second, they provide distributed power storage and production. Disclosed embodiments fill the gap in the distributed power production realm, above battery scales and below pumped hydro and other utility-scale options. This is an important attribute because it allows each facility to better match local power production and demand patterns and to allow for relatively modest investments to achieve the intended goals of power storage. For example, a utility-scale power storage system may require at least $100,000,000 of capital to deploy, while a commercial-scale unit, such as per the present disclosure, may cost as little as $20,000,000. Clearly, the lower "entry cost" of the commercial-scale deployments will make it easier to advance power storage as an essential element of the "smart grid."

Exemplary embodiments create a potential for every sizeable power-using customer of the electric grid, where the customer is also on the natural gas pipeline network, to become one of many distributed-power-storage and distributed-power-generating sites. (By "sizeable" we mean with a power demand of approximately 1 MW or more, over a 4-8-hour peak daily period, for a total of 4-8 MWH.) Thus, for the first time in the history of the overlapping power grid and natural gas (NG) pipeline network, many thousands of customers of those two (generally independent) systems can "connect" the two energy delivery modes to store energy during low power-demand periods and to release that stored energy during high power-demand periods, enhancing the service value and asset value of both the NG network and the electrical network, and substantially reducing the need for newly constructed, large-scale, distantly located power plants.

A third major advantage is that exemplary embodiments provide semi-centralized power storage with distributed power generation. The term "semi-centralized" as used herein means the system is capable of serving a plurality of off-site locations and can be deployed at less than utility-scale. Embodiments identify an entirely new set of "services" and "products" that can be provided by existing and future air separation plants. For instance, semi-centralized power storage sites can convert electric power into mechanical energy, which produces a cryogenic storage medium ($O_2/N_2$), which can be transported to another site where the mechanical energy in the storage medium is recovered to produce electric power. Each such plant can become a semi-centralized source of $O_2/N_2$ that can be delivered to decentralized, distributed power generation sites, thus expanding the market for $O_2/N_2$ products and providing a power storage service and a "power transport" service to the end users at the distributed power generating sites.

In effect, this also provides an alternative electrical transmission system, whereby energy (originally in the form of electricity) is transported (in the form of a cryogenic storage medium) to a point further "downstream" on the energy grid, or to locations beyond the grid or to mobile (rather than stationary) power release equipment. As such, embodiments of the present disclosure provide a means for avoiding the need to permit/site/build new power transmission systems, which today are difficult to permit, politically controversial, and quite slow (if ever) to complete.

Exemplary embodiments allow the $O_2/N_2$ storage medium to be transported to off-site distributed power (outflow mode) locations, thus geographically separating the inflow to storage mode and outflow from storage modes. Such transporting of $O_2/N_2$ from its production source to a distributed power production site constitutes the transport of two sources of mechanical energy: one source is at the original power plant (including wind turbine) that sent its power down the grid to the air separation plant, the second source is the mechanical energy input at the air separation plant which converts the received electric energy (kW) back to the mechanical energy that produces the $O_2/N_2$.

In this embodiment the air separation plant acts as a regional (nearly utility-scale) power receiving, converting and storage system, but sends the stored power (in the form of liquid $O_2/N_2$) to several off-site VPS outflow mode locations that constitute distributed power generation sites. This embodiment allows the inflow-to-power mode to achieve economies of scale, but also achieve a wider "distribution" of the power outflow mode, connecting the two halves via highways, rail lines, waterways or other means of transporting the cryogenic energy storage medium. Thus, the present embodiments identify a vast number of "energy nodes" where the crossing of the (1) electric grid, (2) fuel sources such as the natural gas pipeline network, and (3) the existing road, rail, or navigable waterway, air ways, system allows for the deployment of commercial-scale, distributed power storage and distributed power production facilities. Prior to the present disclosure those three networks, each a product of enormous prior investment, functioned mostly independently of each other without the benefits provided by the present embodiments.

The $O_2/N_2$ production unit at any large air separation plant could serve off-site VPS outflow mode equipment deployed in multiple locations within, e.g., 100 miles of the air separation plant, where no L-Air or $O_2/N_2$ production equipment would be deployed. Thus, the "inflow to storage" part of this novel VPS model would be somewhat "centralized," i.e., "semi-centralized," at large, individual air separation plants, but at scales well-below utility-scale storage deployments. The "outflow-from-storage" that would be linked to each one of those semi-centralized storage facilities could be at many sites within trucking (or rail or waterway delivery) distance of the $O_2/N_2$ (or L-Air) plant.

The reason $O_2/N_2$ would sometimes be shipped (instead of L-Air) is due to the imbalance in the local market demand for $O_2$ or $N_2$ at each air separation plant, where one of those products is sold in large quantities to an existing customer(s), but the other is a low-value "byproduct" of the air separation process. Air consists of about 23% $O_2$ and 75% $N_2$ (by weight) with the remaining portion made of $CO_2$, argon, neon, hydrogen, helium, krypton and xenon, as well as some moisture. Thus, any air separation plant that is producing $O_2$ for sale to, e.g., steel mills, glass manufacturing facilities or the health care industry, is also producing about three times as much $N_2$. Embodiments of the present disclosure substantially solve that imbalance by allowing the air separation plant to be the semi-central energy storage facility (for the production of the cryogenic storage medium) from which many decentralized power generation facilities are supplied by $N_2$. In locations where $N_2$ is the valuable commodity and $O_2$ is in surplus, $O_2$ could be the cryogenic storage medium delivered to off-site distributed power generation facilities.

Exemplary storage methods and systems advantageously separate (by potentially hundreds of miles) the inflow to storage equipment at large, semi-centralized air separation plants, which have economies of scale and the ability to receive large amounts of off-peak power from the grid (and which in many cases already exist), from many smaller distributed facilities that would use most of the power generated during the peak hours at each such facility, with modest amounts of "left over" power sold to the local power grid during the daily peak period. Thus, the power outflow mode could be widely distributed, and the distributed power could be easily "absorbed" by existing grid. The "connection" between each hub and the various VPS outflow mode sites could be multiple container deliveries of liquid $O_2/N_2$, by trucks on existing highways, by rail car, by waterborne vessel, or other surface transport systems or methods, or by other transport methods now known or future developed including airways, aerospace, and subsurface.

An NG pipeline network could deliver the NG used by the prime mover in the outflow mode, and the same pipeline network could deliver NG to the air separation plant, which would produce LNG to fuel the trucks that deliver the $O_2/N_2$ to the off-site, decentralized, distributed power generation sites served. The production of LNG at air separation plants is especially reasonable because the cryogenic process required to produce LNG is very similar to the cryogenic process to produce L-Air, liquid oxygen and liquid nitrogen, all of which require similar front-end water and $CO_2$ removal, multi-stage compression, deep-grade refrigeration, and storage/transport in similarly insulated cryogenic tanks.

A fourth major advantage is that exemplary systems and methods facilitate transporting mechanical power outside, or independently of, the electric grid. Currently, "energy transport" is routinely accomplished by shipping fuel from one location to another. Examples include the transport of NG in pipelines and the transport of LNG, coal, oil, and other fuels by ship, rail and trucks, where the fuel contributes to the chemical process (combustion, oxidation, and energy release) that is the norm in all fossil-fueled power generation systems. On the other hand, the transporting of "refrigeration" in the form of ice had a long history that extended into the early $20^{th}$ century. Today, the transport of man-made ice, a product of mechanical energy input, is no longer necessary or economically viable because refrigeration can be produced at the location where it is needed. Embodiments of the present disclosure seek to produce power where it is needed but also allow some of the "mechanical" aspects of power production to be transported from one site to another.

The production of power, or the enhancement of power production, by mechanical means is well understood, but up to now, has not been the subject of "transporting" efforts. For example, it is well known that inlet-air cooling of gas-fired turbines (GT) increases the density of the air "breathed" by the GT, thus reducing the mechanical load on the turbine's (front end) compressor. However, prior to disclosed embodiments there was no awareness in the power generation industry of the cost-effective possibilities for the "transport" such mechanical enhancements to power production from one site to another. Until now, there was no practical way to transport significant mechanical energy from one location to another, say, 100-miles apart.

Exemplary embodiments use $O_2/N_2$, whichever has the lower value at any semi-centralized air separation plant, as a mechanical energy transport medium, allowing the "mechanical energy content" of that cryogenic fluid to be moved from a production site (e.g., the centralized air separation plant) to multiple, off-site, distributed power production facilities. Thus, the thermal fuel that drives those distributed power production sites could arrive by standard transport mode (by NG pipeline, by LNG trailer/rail car/ship, etc.) and the mechanical energy content that would enhance that site's power output would also arrive as $O_2/N_2$ by trailer, rail car, or waterborne vessel.

The $O_2/N_2$ in this model is "transporting" the mechanical energy it received during the compression, liquefaction and distillation process at the air separation plant. Moreover, the off-peak power that drove that mechanical process also contained mechanical input, especially if the power used to make the $O_2/N_2$ came from wind turbines, which sent their mechanical energy down the electric grid to the air separation plant. Thus, the present disclosure facilitates, and allows for the first time), the cost-effective transport of mechanical energy outside of the power grid.

Figure 1B:
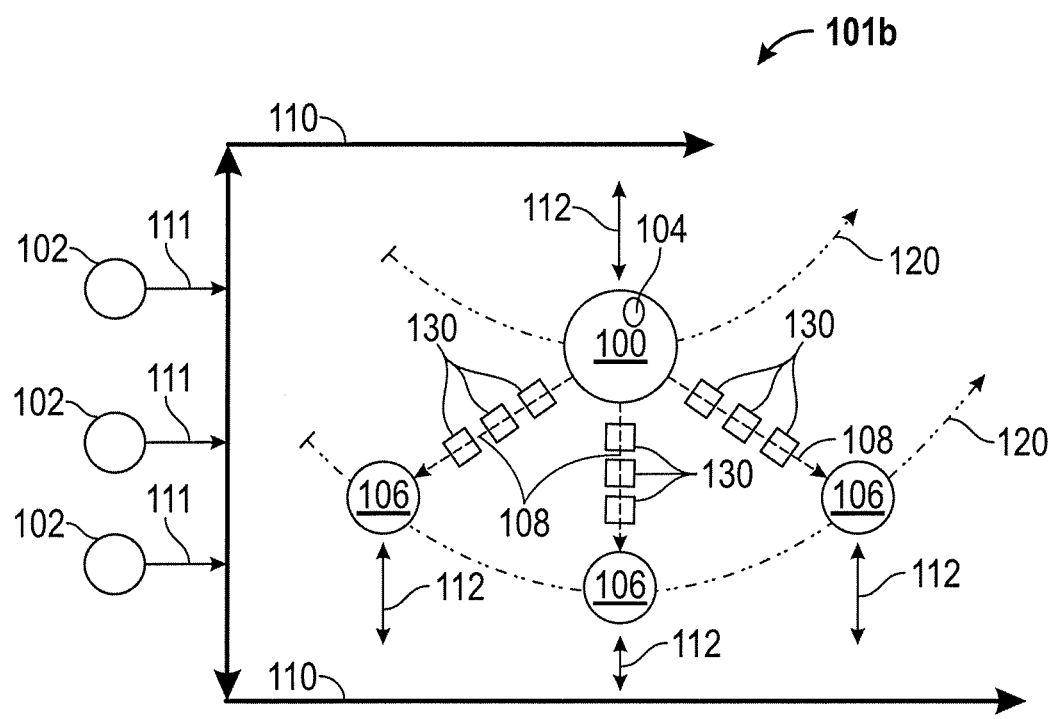
FIG. 1B is a box diagram of an exemplary embodiment of a semi-centralized power storage and distributed generation system and method in accordance with the present disclosure.

Referring to FIGS. 1A and 1B, exemplary embodiments of a system of semi-centralized power storage and distributed power generation will now be described. An exemplary power storage and distributed generation system 101a comprises at least one semi-centralized power storage facility 100, which includes a power storage medium 104, which could be liquid air. The power storage facility 100 could be an air separation plant, in which case the power storage medium 104 could be liquid air or $O_2/N_2$ from the air being separated into its constituents. The power storage facility could also be located at a military/naval base, railroad yard or port, or at any "utility-scale" power storage and power outflow facility. In the exemplary embodiment illustrated in FIG. 1A the semi-centralized power storage facility 100 is deployed where both functions, i.e., inflow-to-storage and outflow-from-storage, occur at the same facility.

The electric grid 110 receives off-peak power from at least one power producing site 102, including wind farms, solar farms, nuclear power plant etc., and where that power is sent to power storage facility 100 by way of the electric grid 110. It should be noted that off-peak power could be produced at the power storage facility 100, e.g., in cases where the site has its own wind turbines, anaerobic digester or LFG source, avoiding the need to receive (some or all) of the inflow to storage power from the grid.

A power connection from the grid 110 could operate such that power is delivered to power storage facility 100 during the off-peak period and stored there as L-Air or one of the other cryogenic storage fluids mentioned in this disclosure and where power is used by the power storage facility 100 during the peak power demand period, with no power leaving the site, and/or where any surplus power not required by the host site 100 is sent to the grid during the peak period. Hence the power 112 is shown as a double headed arrow "floating" with gaps at both ends, indicating that it is sometimes an "on" and sometimes an "off" connection between the grid 110 and the host site 100. Another fuel source 120, which could be a natural gas grid, provides the fuel for the prime mover that operates during the power outflow mode, and which prime mover provides the waste heat that enables the recovery of the mechanical energy stored in the cryogenic storage fluid. Thus, as outlined above the electric grid 110 and the natural gas grid 120 are integrated at a single power storage and power production site that is not just a "peaker" and is certainly not a large-scale power plant. However, the exemplary embodiment illustrated in FIG. 1A can be co-located with large-scale power plants, allowing the low-value, off-peak power production from such a plant to be stored for peak-period release.

Referring to FIG. 1B, an exemplary power storage and distributed generation system 101b comprises at least one power storage facility 100, which could be an air separation plant, and includes power storage medium 104, either air or $O_2/N_2$. The power storage facility 100 provides $O_2/N_2$ along transport routes 108 to several, off-site, distributed power generation facilities 106, which are at different locations than the power storage facility 100. In exemplary embodiments, the power storage facility 100 functions as an energy storage company (similar to today's energy service companies ("ESCOs")). The source of the power stored by the power storage facility 100 can be multiple power producing sites 102 which send their (off-peak) power to the power storage facility by way of local connections 111 to the electric grid 110. The release of the stored power may occur at multiple, distant power release facilities 106 that may use all or a portion of the power they generate for on-site power needs and/or send their surplus power the electric grid 110.

Those power producing facilities 102 may be "renewable" generation facilities, such as wind farms, solar farms or landfill-gas-to-kW sites, or may be base-load power generation plants fired by coal or natural gas, or nuclear power plants, all of which cannot fully turn down their off-peak power production at night, and are best served by sending their power output (at reduced prices) to distant power storage facilities 100. As discussed in more detail herein, exemplary embodiments utilize a source of low-cost, off-peak power production (such as, but not limited to, wind turbines), and a grid connection that can deliver that off-peak power to the deployment sites of the present embodiments. That same grid connection can take away any surplus power produced at the deployment site during the peak power demand period, which surplus power is not used by the host site.

In exemplary embodiments, the power storage facility 100 would be its own "customer" for the stored power by releasing that power during the daytime peak period as outlined throughout here. However, as an ESCO, a portion of the power storage medium could be transported by mobile power storage/transport units 130, such as truck, rail car or waterborne vessel or other surface transport systems, to distributed power generation facilities 106 where only the cryogenic storage medium (L-Air/$O_2/N_2$) storage tank and the outflow-from-storage equipment were deployed, with no on-site cryogenic storage medium production capacity. Each one of those distributed power generation sites 106 could also be served by any outside fuel source, including but not limited to NG pipeline 120, as could the air separation plant 100. Liquefied natural gas (LNG) could fuel the mobile power storage/transport units 130 if the air separation plant 100 produced LNG in addition to its normal products of air.

The link from the electric grid 110 to distributed power generation site 106 is shown as "floating" arrows 112 because each site could receive nighttime power from the grid (to the extent it needed such off-peak power) and would receive no (or reduced) power from the grid 110 during the daily peak power demand period. Moreover, because each commercial-scale deployment at distributed power generation sites 106 would be a specifically sized, pre-engineered, modular "appliance," the output of that power release equipment will often be greater than the various (and fluctuating) power demand requirements at each of the several sites 106 served by the ESCO.

In some measure the economic viability of such an ESCO network is dependent on the "affordability" of the pre-engineered outflow-from-storage appliances. The more modularity there is in each deployed outflow facility, and the larger the local, regional and international market for such deployments, the lower the cost of each deployment will likely be. Embodiments of the present disclosure induce those conditions by allowing the "overcapacity" of each distributed power generation (i.e., outflow) facility 106 to become a key element of the network illustrated by FIG. 1B. For example, if each of the distributed power generation facilities 106 needs from 1 MW to 4 MW of power, than the same 5 MW, pre-engineered, modular version of the outflow appliance would be deployed at each site, allowing the excess output from each distributed power generation site 106 to be sold by the ESCO to the grid 110. In other words, each deployment at various distributed power generation sites 106 could be oversized, relative to the customer's demand, such that excess power could be sold to the grid 110 by the ESCO.

Thus, exemplary embodiments include the flow of surplus power 112 from each distributed power generation facility 106 back to the grid 110 during peak power demand periods (or during other periods, as needed). In that way, the local grid can receive power from various distributed power generation sites 106 and distribute that power, locally to facilities that are not part of the ESCO network. Such localized power production mitigates grid congestion, reduces line losses, allows utilities to defer/avoid upgrades to their electrical distribution lines, and allows for an additional revenue stream to the ESCO. In turn the multiple, single-sized deployments allow the ESCO to offer a competitively priced service to each distributed power generation site 106 and allows the ESCO to become a bigger customer of each of the 102 power producers and a preferred customer of the 110 grid operator. The ESCO would be preferred because it is a steady client and provides important services that the grid operator does not provide.

The operator of the NG network 120 may or may not be the same entity that operates the electric grid 110. In any event, the NG system 120 benefits from the centralized power storage and distributed generation system by having a more distributed customer base, including the ESCO at 100 and the various power outflow points at the distributed power generation facilities 106. Significantly, in multi-season locations, such as the US and Europe, much of the power storage and generation (outflow) issues covered by the present disclosure are most acute during the summer months when power demand is at its highest. Thus, the NG network 120 is more fully utilized in the summer as a result of the present embodiments then it would be otherwise, yielding greater "capital efficiency" for the asset owners and rate-payers.

Furthermore, FIG. 1B shows the schematic confluence of the natural gas network 120, the electric grid 112 as well as the road/rail/waterway transport route network 108 that cross each other in millions of points throughout North America and Europe. Generally, the natural gas network is below ground, the electric grid is mostly above ground, and the road/rail/waterway network is between the two. The three systems sometime occupy the same "rights of way," but often extend into independent (non-overlapping) networks. The present embodiments allow for the comprehensive integration of those three networks at all the crossing (confluence) points. At many thousands of such confluence points, or "nodes," there exists a commercial, industrial, or community-facility "customer" for electric power. In the absence of embodiments of the present disclosure, that customer has very few (if any) choices as to where and how that power is produced and how it is delivered. Indeed, that customer is captive to the standard grid (which is not a "Smart Grid" but a dumb one), where, for example, the customer incurs "demand charges" for use of power during the peak demand periods, and where the grid is "resistant" to the possibility of receiving power from the customer.

By contrast, embodiments of the present disclosure open the door to include many thousands of such commercial, industrial or community-facility power customers (e.g., with a need for 1 MW or more of peak power) into the network illustrated by FIG. 1B. It is the confluence of those three delivery systems—kW by the electric grid, BTU by the NG network, and stored mechanical energy by truck, or rail car, or barge—that allow embodiments of the present disclosure to up-end the existing power production, (storage) and delivery system. (Storage is in parenthesis because the existing power system has virtually no storage capacity.)

Embodiments of the present disclosure allow for the Smart Grid, beyond software and metering improvements, by "requiring" that the electric grid function in every possible direction (which it can) rather than in only one direction, from the power plant to the customer. Thus, the symbolic meaning of the double-headed, "floating" arrows shown on FIGS. 1A and 1B is the multi-directional aspect of the grid, where virtually every point on the grid can be as important as any other point. The truly Smart Grid will allow for the distributed power storage and distributed power production embodiments of the present disclosure. The present embodiments will also increase the viability of smaller ESCOs, creating competition for the less nimble, larger players in the power industry. Increased competition will result in lower prices; increased deliverability of energy produced from renewable sources; and generally less emissions, despite the fact that each deployment site will have its own fossil-fueled (NG) prime mover.

FIG. 1B yields at least one more embodiment. Each of the distributed power production sites 106 may also include off-peak production capabilities, such as a single (appliance scale) wind turbine. Such a device can send power back to the power storage facility 100 in the same way that the air separation plant receives power from the various (distant) power production sites 102. This embodiment of FIG. 1B allows for small-scale, local deployments of renewable power generation systems. Other examples might include power produced from the burning of anaerobic digester gas at a sewage treatment plant or a dairy farm. In all such cases, the off-peak power source can be quite small (a few kilowatts) but would be relatively close to the air separation plant 100, taking advantage of the local grid. At the extreme, such a model would allow every building, no matter how small, to host, for example, a single (appliance scale) wind turbine, which would send its off-peak output to the semi-centralized power storage facility 100. That model would truly constitute a Smart Grid, because power (analogous to information) would be flowing in all direction to and from all locations connected to the grid. The present disclosure facilitates that embodiment.

Figure 2:
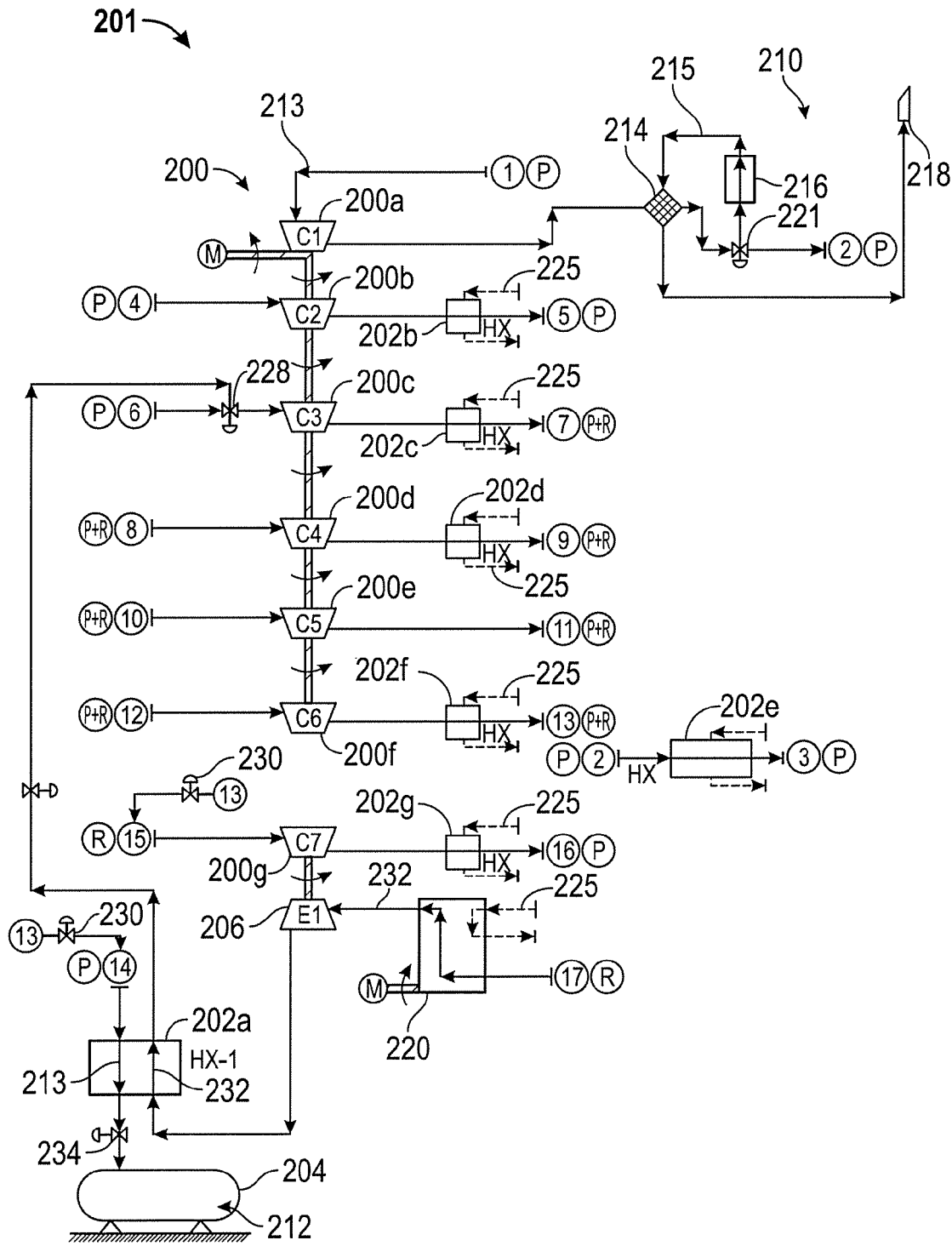
FIG. 2 is a box diagram of an exemplary embodiment of a power storage system in accordance with the present disclosure.

FIG. 2 illustrates an exemplary embodiment of an inflow mode for storage of mechanical energy using L-Air as the cryogenic storage medium. For ease of illustration, FIG. 2 shows sequential numbered points along steps of an exemplary process, with the same number at different locations on the figure representing the same point in the process. The disclosed inflow-to-storage mode eliminates the use of an absorption chiller to inter- and after-cool the air streams as they move through the several stages of compression. Instead, the mechanical chiller that provides the relatively deep refrigeration required at the turbo-expander inlet will also provide a "side load" of low-grade refrigeration to inter- and after-cool the air that moves through the main compressor. The notations "P" and "R" correspond, respectively, to product air that is to be stored and refrigerant/recycle air that is the refrigerant air stream that liquefies the compressed product air.

An exemplary energy storage system 201 comprises a compressor array 200, which includes a plurality of compressors 200a-200g or compressor stages. At least one heat exchanger 202 is fluidly connected to at least one of the compressors in the array 200. Exemplary embodiments employ a plurality of heat exchangers 202a-202g such that heat exchanger 202b is fluidly connected to compressor 200b, heat exchanger 202c is fluidly connected to compressor 200c, heat exchanger 202d is fluidly connected to compressor 200d, heat exchanger 202f is fluidly connected to compressor 200f, and heat exchanger 202g is fluidly connected to compressor 200g. At least one of the heat exchangers, 202a in the illustrated embodiment, is fluidly connected to a cryogenic storage vessel 204. Exemplary systems further comprise at least one expander 206 in fluid connection with the compressor array 200, in particular, with compressor 200g. A mechanical chiller 220 is fluidly connected to the expander 206 and provides side load refrigerant 225 to the various heat exchangers the serve to inter- and after-cool the air that exits the several compression stages. Valves are used at various locations throughout the system, including valve 230, which serves to separate the air into a product stream (which becomes the power storage medium) and into the recycle stream, as described herein.

In operation, the power storage medium 212 in the form of ambient air at approximately 14.7 psia and at an average nighttime temperature of about 53° F. enters point 1 and is compressed in compressor 200a, the first stage of multi-stage compressor 200, here shown as a six-stage integral gear compressor. Other compressor configurations may also be selected, including two such integral gear compressors, one with two stages and one with four stages; as well as six stage reciprocating compressors (most suitable for smaller deployments of the present disclosure); and other variations of multi-stage compressors. It should be noted that the compressor array 200 is shown in FIG. 2 as just one possible configuration.

After the first stage of compression, the power storage medium, now approximately 40-psia air, with its temperature raised to about 242° F., due to heat of compression, enters a clean-up assembly 210 including a molecular sieve 214 (or membrane or other similar device) where the moisture and $CO_2$ content of the air are removed so that no ice forms later on in the process. The molecular sieve design is well understood by those in the gas processing industry and may include several vessels that contain an adsorbent such as zeolite, and which vessels operate in a programmed sequence. As the zeolite becomes saturated, that vessel is "swept" by clean sweep air 215 from another vessel, and that non-toxic sweep air, containing moisture and $CO_2$ is vented to the atmosphere. That sweeping (or regeneration) process may require heat input, which may come from an electric warmer or from a natural gas fired heater. The present disclosure is agnostic as to the most efficient method for removing the moisture and $CO_2$ from the air. The air clean up assembly 210 shows an exemplary arrangement of the multi-vessel molecular sieve 214, an electric warmer 216, a sweep air vent 218 and a valve 221 that separates sweep air flow 215 from product air flow.

After the cleaning in the mole sieve 214 and after each stage of compression beyond the second stage, the heat of compression is removed by a first stream of low-grade refrigeration 225 provided as a side load from the mechanical chiller 220, which will be described below. (Other side load sources may include low-grade surplus refrigeration available at the deployment site, for example from an air separation plant.) Returning to the several stages of compression, the inflow product stream 213 (which will be stored as the power storage medium 212) is joined by recycle stream 232 in valve 228 after which that combined stream enters the third compressor stage. Thus, a single compressor array is compressing both the product stream and the refrigerant stream, because both of those streams are air free of $CO_2$ or moisture. Similarly to valve 228 where those two streams are joined, the power storage medium 212 is separated into product stream 213 and recycle stream 232 by valve 230 at point 13, which is shown twice in FIG. 2 for illustration purposes, even though that point and valve only exist in the singular. By that point in the compression process, after several stages of compression, the combined product and refrigerant air stream is at approximately 500 psia.

A portion of the outflow from valve 230 is sent to compressor 200g, which is the compressor-load on the cryogenic turbo-expander 206. As in all the other compression steps, the heat of compression is dissipated in a heat exchanger by low-grade heat produced by the mechanical chiller 220 or another source. The approximately 497-psia outflow from that heat exchanger is then sent to the mechanical chiller 220, where it is cooled to approximately −40° F. and then sent to expander 206 where the pressure of the refrigerant/recycle air stream 232 is reduced to about 75 psia, thus cooling it to about −256° F. That deeply chilled air is the refrigeration source that cools the other portion of the air (the product air stream 213) that left valve 230.

Figure 3:
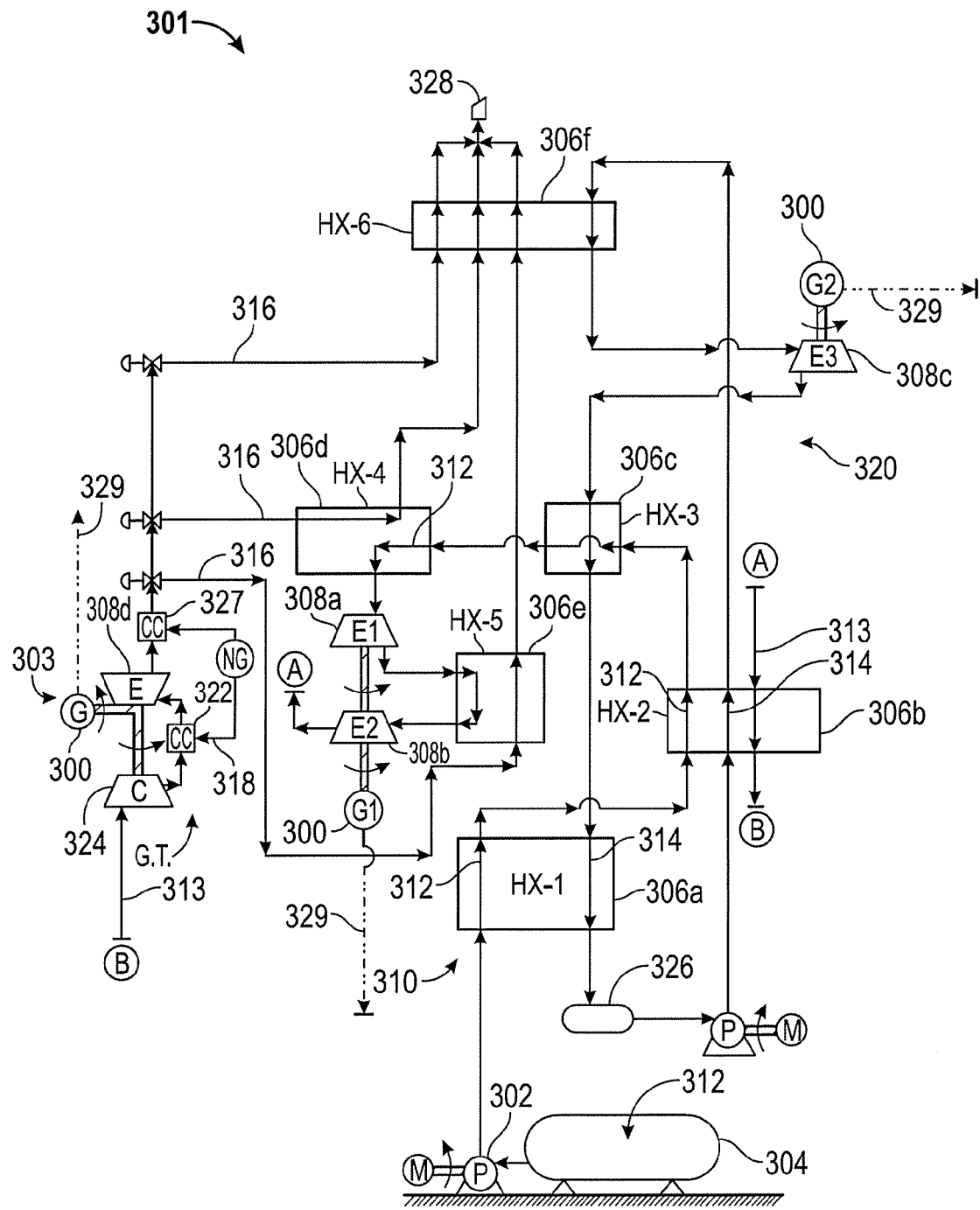
FIG. 3 is a box diagram of an exemplary embodiment of a power release and cold recovery system in accordance with the present disclosure.
Figure 4:
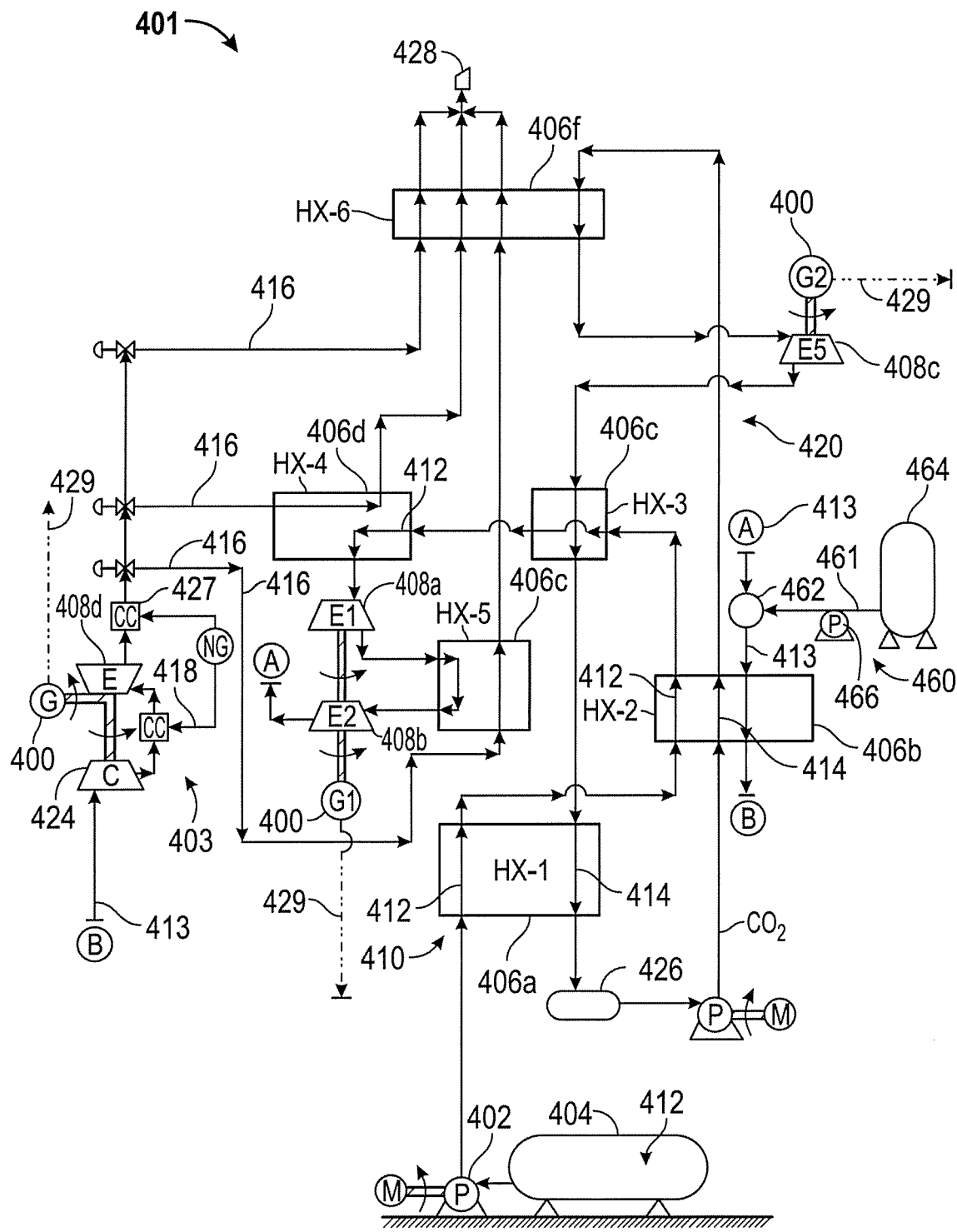
FIG. 4 is a box diagram of an exemplary embodiment of a power release and cold recovery system in accordance with the present disclosure.
Figure 5:
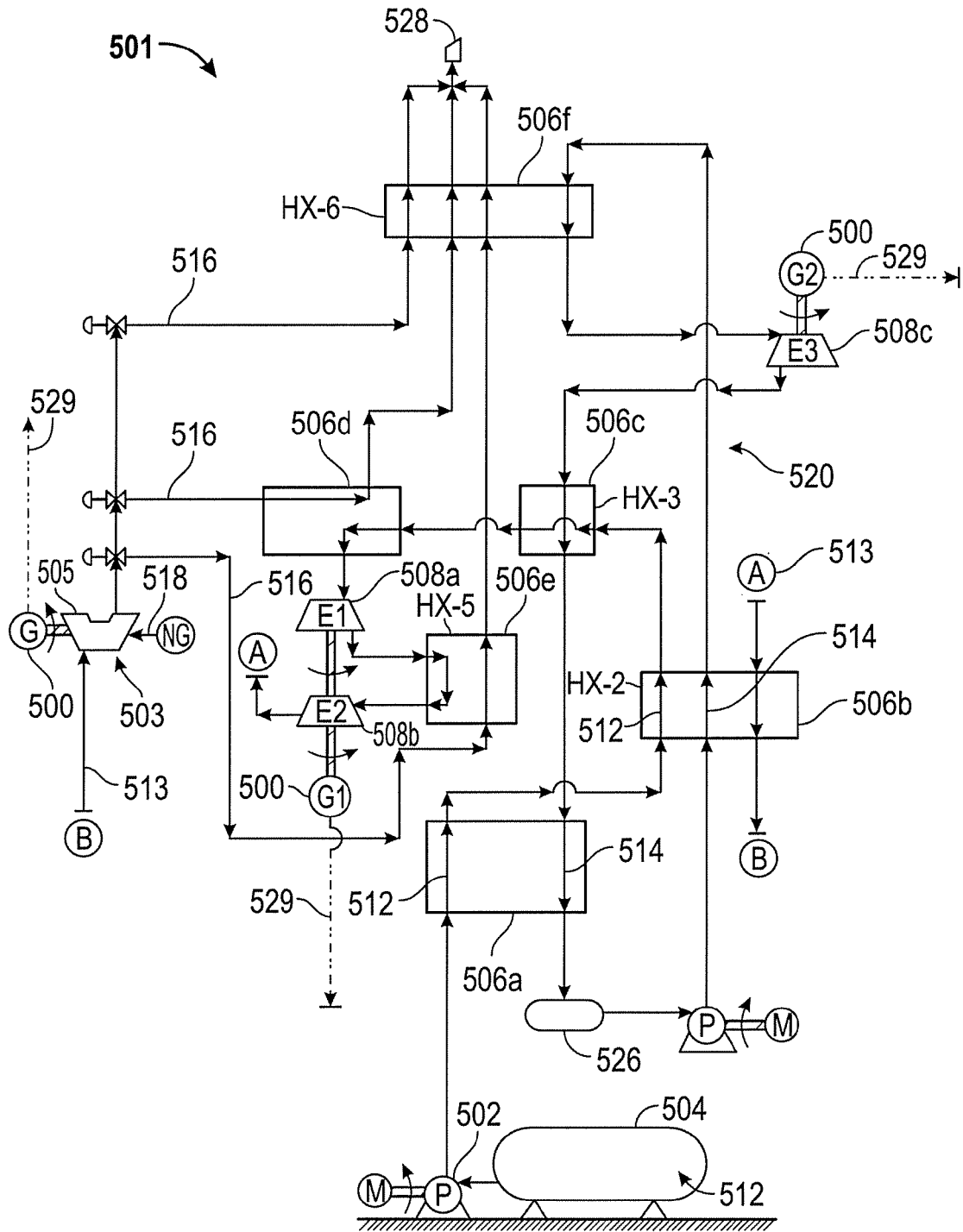
FIG. 5 is a box diagram of an exemplary embodiment of a power release and cold recovery system in accordance with the present disclosure.

The refrigerant/recycle stream 232 and the product stream 213 move in a counter-flowing (opposing) manner through heat exchanger 202a, which is where the product air stream 213 is "liquefied", from inlet conditions of about 50° F. at about 497.5 psia to outlet conditions of about −230° F. at about 496.5 psia. The valve 234 between heat exchanger 202a and the cryogenic storage tank 204 is a control flow valve. The storage tank 204 is the same or similar storage tank that is shown in FIGS. 3-5, which illustrate exemplary outflow-from-storage modes. The storage tank may also be a mobile version that transmits the stored energy to off-site, distributed power production facilities.

It should be noted that in the paragraph above the quotation marks around liquefied are used because that outflow product does not necessarily need to be a true liquid. The present disclosure allows for that product air stream 213, sent to storage tank 204 and stored as the power storage medium 212, to be in a "metacritical" phase, such that its temperature is colder than the air's critical temperature and its pressure is higher than the air's critical pressure. Such metacritical air can be as dense as a true liquid (which can be defined as having a temperature colder than its critical temperature and a pressure that is higher than its critical pressure), but will require less energy input to achieve. Such metacritical air is dense enough to store in moderate pressure cryogenic storage tanks and dense enough to be pumped to a higher-pressure (during the power outflow mode) by standard cryogenic liquid pumps. In other words, metacritical air will behave much like liquid air, but require less refrigeration energy input to produce.

Turning to FIG. 3, exemplary embodiments of a system and method of releasing stored power will now be described. An exemplary system of power release and cold recovery 301 with L-Air (or metacritical air) as the power storage medium 312 comprises a cryogenic storage vessel 304 with a pump 302 driven by motor M, the pump 302 being fluidly connected to the storage vessel 304. The system 301 further includes a plurality of heat exchangers 306a-306f in fluid connection with the motor-driven pump 302 and the storage tank 304. At least one expander 308 may include a plurality of expanders 308a-308d fluidly connected to at least one of the heat exchangers 306a-306f. Exemplary embodiments utilize a prime mover assembly 303, e.g., a standard gas turbine (GT) array, to produce a portion of the outflow power 329 and the heat source to warm the working fluid loops, which consist of the primary air loop 310; and the secondary (cold recovery) working fluid loop 320, where the working fluid could be any suitable refrigerant, including but not limited to air, ammonia, suitable hydrocarbons, $CO_2$, or a combination thereof. As illustrated on FIG. 3 power output 329 occurs in three locations, at the GT prime mover, at the air expanders, and at the working fluid expander.

In general, exemplary embodiments of power release and cold recovery seek to more simply recover the refrigeration content of the cryogenic storage medium. The present disclosure seeks to limit the cold energy transfer from the stored medium to only one other (secondary) working fluid, and to use any remaining low-grade refrigeration in the storage medium by cooling air and sending it at approximately −4° F. to the air intake of the GT that is the heat source in FIG. 3.

That cold air would be bone dry and absent of $CO_2$ because it went through a mole sieve (or other such device) prior to its production as a storage medium. If $O_2/N_2$ were the refrigerated fluid that was warmed and expanded in the VPS outflow mode, then any remaining low-grade refrigeration could be used to cool (to approximately −4° F.) the intake air to the GT. As discussed below, in such embodiments methanol (or any other similar alcohol) could be "spritzed" into the GT's intake air to prevent freezing of the moisture in the air. It should be noted that another cold recovery embodiment could transfer the cold content of the cryogenic storage medium to LNG or Cold Compressed Natural Gas (CCNG) production, thus substituting the LNG/CCNG production process for the secondary working fluid cold recovery loop.

In operation, the stored L-Air 312 (or metacritical air) at approximately −230° F. and 496.5 psia exits storage tank 304 and is first pumped to pressure in motor-driven cryogenic liquid pump 302, such that the air enters heat exchanger 306a at about −222° F. and about 1,715 psia. The cold outbound air condenses a counter-flowing stream of working fluid 314, which is in its own closed loop 320, as discussed below.

The air exits heat exchanger 306a at about −200° F. and enters heat exchanger 306b, where, along with a cold stream of working fluid 314, it cools the power storage medium 313, a counter-flowing, low-pressure stream of air, from about 420° F. to about −4° F. That low-pressure air, 312 is the same air that is traveling toward additional heating and expansion steps, but having been expanded and still containing residual heat. Thus heat exchanger 306b is a heat and cold recovery device where the remaining heat content of the expanded air is used to pre-warm the outbound air and the pre-expanded working fluid 314 and where the refrigeration content of those two streams is used to chill the low-pressure air so that it can become cold dry inlet air to the GT's front-end compressor 324.

Returning to the power storage medium 312, high-pressure outflow air leaves heat exchanger 306b at about 90° F., moves on to heat exchanger 306c (another heat recovery device) where returning working fluid 314 at about 595° F. continues to pre-warm the air stream 312. The power storage medium 312 then moves to heat exchanger 306d, where the hot gaseous products 316 of combustion from the GT 303, at temperatures about 1,100° F., warm the high-pressure air 312 to within nearly ten-degrees of the GT's exhaust 316 of about 1,100° F. The power storage medium 312, hot, still high-pressure air, is expanded in a first expansion stage, expander 308a, from about 1,710 psia to about 171 psia, an approximately 10:1 expansion ratio. The expanded air leaves expander 308a at about 420° F., is reheated in heat exchanger 306e by a counter-flowing stream of GT exhaust 316, and then expanded in expander 308b to an outlet pressure of about 17 psia, also about a 10:1 expansion ratio. That last stage of expansion will yield an air stream at about 420° F., which, as mentioned above, is the heat source in heat exchanger 306b. Other expander conditions (such as inlet and outlet temperatures and pressure letdown ratios) are possible.

Returning to the GT array 303, the NG fuel stream 318 moves to the combustion chamber 322, and the cold, dry and dense inlet air stream moves through the front-end compressor 324 of the GT array 303, on to the GT's combustion chamber 322 and then to the expander 308d, which is loaded by generator 300. As outlined above, the main purpose of the GT is to provide the high-grade waste heat that warms the air and working fluid streams. Its secondary purpose is to produce power output that supplements the power output recovered from the two-stage expansion of the air and the single stage expansion of the working fluid. The GT can also generate back-up power if inbound electricity from the grid is not available (due to a power outage, natural disaster, terrorist disruption, etc.)

The temperature of the hot exhaust 316 from the GT (i.e., the gaseous products of combustion) will vary, depending on the efficiency of the GT (the more efficient the cooler the outflow); and on the inlet temperature of the air 313, where colder inlet air tends to yield cooler outflow. Most GTs that are available within the range of, e.g., between 100 kW to 5,000 kW (but other ranges are possible) will yield exhaust streams with temperatures of around 900° F. to 1,000° F., which is high-grade enough to yield "round-trip efficiencies" (RTEs) for embodiments of the present disclosure at more than 90%. However, several well understood "afterburner" or "duct burner" arrangements are available to allow a warmer GT exhaust to be sent to the air and working fluid loops. Those familiar with thermodynamics and the optimal performance of heat exchangers and hot gas expanders will be able to select the appropriate post-combustion supplemental heating of the GT exhaust to yield the optimal temperatures.

Returning to the working fluid loop 320, after the working fluid 314 is condensed in heat exchanger 306a and collected in a buffer tank 326 at about −30° F. and about 139 psia (depending on the selected working fluid), it can be pumped to pressure by the same type of motor-driven, cryogenic liquid pump 302 as mentioned above for pumping the L-Air power storage medium 312. The liquid working fluid 314 is pumped to about 1,710 psia and sent through heat exchanger 306b, where it helps to cool a counter-flowing stream of air 313 to about −4° F. (Colder inlet temperatures may also be possible.) The now about 90° F. working fluid 312 is further heated in heat exchanger 306f to about 1,000° F., and expanded approximately at a 10:1 expansion ratio in generator-loaded expander 308c, exiting at about 171 psia and about 595° F.

The still warm working fluid 314 then moves through heat exchanger 306c to help pre-warm the counter-flowing air, thus cooling the working fluid 314 to about 100° F., before it enters heat exchanger 306a for condensation/liquefaction, completing the closed working fluid loop 320. It should be noted that the exemplary embodiment illustrated in FIG. 3 constitutes an open loop for the air and NG streams and a closed loop for the working fluid stream. The stored power storage medium 312, L-Air, leaves the system as GT exhaust 316 through flue 328. Electricity is produced by the GT's generator 300, by the generator(s) 300 that loads the working fluid expander, and by the generator(s) 300 that load the air expanders.

By substituting a single GT for a stand-alone combustion chamber (which would produce hotter exhaust), embodiments of the present disclosure can comfortably utilize the (cooler) approximately 1,100° F. outflow stream from the GT. For example, a single GT rated at 1 MW, but with a maximum 2.25 MW of output (achievable with cold inlet air), allows for the cost-effective and highly efficient deployment of Commercial-Scale VPS units with about 14.4 MW/115 MWH of total output. This advantageously provides economic viability of VPS deployments at scales as small as kW scale and at about 1 MW, but where the prime mover can be a natural gas fired engine, rather than a GT.

At the 14.4 MW/115 MWH scale, hundreds or thousands of pre-engineered, factory-built, skid-mounted Commercial-Scale VPS units could be deployed annually in the US and globally, with each unit providing all or a portion of its power output to the host site, and with the surplus portion (if any) sold to the grid. In addition to the use of the GT to produce some of the "distributed power" production, and thus providing a readily available high-enough-grade heat source (but a heat source that is not too hot), the present disclosure offers the following: instead of two working fluid loops (e.g., $CO_2$ and $NH_3$) driven by waste heat, as in other VPS embodiments, the present embodiments eliminate the third ($NH_3$) loop and contemplate a variety of working fluids that can be substituted for $CO_2$.

In addition to condensing the closed loop working fluid, the outbound L-Air and the cold, pumped-to-pressure working fluid streams, cool the expanded air, allowing that near atmospheric air to be sent to the GT as inlet air at −4° F., summer and winter in any climate. That last step in the "cold recovery" process allows the GT to produce the 2.24 MW mentioned above, rather than only 1.5 MW (in the summer) to 2.0 MW (in the winter) that it would normally produce. That yields a 12% to 49% increase in the power output of the GT, while making good use of the remaining low-grade refrigeration in the outbound L-Air.

In exemplary embodiments, power release systems and methods achieve an optimal cold- and heat-recovery balance during the power outflow mode and an optimal balance between the fuel used by the prime mover and the fluids used by the system, to convert stored mechanical energy into distributed power production. More particularly, the size of the cryogenic storage tank 304 and the flow rate of the power storage medium 312 from the tank to the GT 303 can be "matched" to the cold air intake rate of a specific GT. In turn, the working fluid 314 flow rate can be matched to the refrigeration available from the outbound air (to condense the working fluid) and the amount and grade of heat available from the GT 303 to optimize the energy recovered at the hot air and hot working fluid expanders which are generator-loaded.

In order to facilitate that balance, one point of "flexibility" within exemplary systems is the amount and grade of the heat produced by the GT 303, which can than correlate with the flow rate of the power storage medium 312 and working fluid 314. As discussed above, that amount and grade of heat can be controlled by including an after-burner or duct-burner in the GT array 303, and or by providing a supplemental heater to warm the air and/or working fluid streams. An afterburner 327 or supplemental heater may benefit from the infusion of extra O2, which will result in a hotter combustion process. Within the limits of combustion chambers, heat exchangers, and hot gas expanders, such hotter-than-standard products of combustion can enhance the outflow mode's performance. Thus, one final adjustment to the flow rates can be by way of NG flow rate to the GT and/or to the afterburner 327 and/or to a supplemental heater.

The following is an exemplary embodiment of such a balancing which can be used with the system and method of FIG. 3 where the prime mover is a GT and the power storage medium is L-Air. First, the flow rate of the approximately −4° F. air intake of the GT 300 is matched with the selected L-Air storage capacity. Also, the refrigeration content of the stored L-Air power storage medium 312 is matched with the refrigeration needed to condense/liquefy the working fluid in closed loop 320 that serves to re-use the available refrigeration in the stored L-Air to condense the working fluid 314, allowing it to be pumped to pressure, warmed and expanded in a generator-loaded expander. Enough low-grade refrigeration is reserved to allow for the delivery of −4° F. air 313 to the intake of the GT 303 where that low-grade refrigeration is recovered from cold air 312 and working fluid 314 streams before they are heated by the GT exhaust 316.

A portion of the heat content from the GT's approximately 1,000° F. exhaust is allocated to the pumped-to-pressure air, so that the stored energy in the L-Air can be most effectively released. The remainder of the GT's hot exhaust heat content is allocated to the pumped-to-pressure working fluid, whose flow rate (per the above) matches the flow rates of the L-Air 312 and GT exhaust gas 316. In the event that the available heat from the GT exhaust is not quite enough, an NG-fired afterburner 327 (or a direct-fired heater) is provided to the GT hot exhaust 316, to reheat that exhaust at an optimum point in the system, in order to produce enough heat to match the L-Air and working fluid flow rates.

Thus, exemplary embodiments of the present disclosure could balance the flow rates of fuel to the prime mover with the flow rates of the refrigerated storage media with the flow of the working fluid, where the flow rates of the refrigerated storage media accounts for its refrigeration content relative to the condensation that is required for the working fluid loop, and where any low-grade refrigeration that remains in the cold fluids is fully utilized in the cycle. To achieve those balanced flow rates and heat and cold distributions, an afterburner or supplemental heater (with or without the use of extra $O_2$) can be integrated into the cycle.

However, for some deployments, that near-perfect balance of working fluid flow rates, and heat and cold transfer, may not be cost-effective. In those instances, the present disclosure can be "reduced" to its simplest embodiments. For example, the deployment of the exemplary embodiments at an air separation plant will allow (if desired for the sake of simplicity) a single cryogenic fluid, e.g., air, to be pumped to pressure, heated and expanded, without the working fluid loop, such that any unused refrigeration in the L-Air may be used to pre-cool the inlet to the GT and/or is used to produce more L-Air.

Similarly, if $N_2$ is the cryogenic fluid, e.g., at a laboratory, or food packaging plant, or at a military base, the use of the $N_2$ for other purposes by the host site may be the prime motivation for having liquid $N_2$ at that site. In such a context, the distributed power production attributes of the present disclosure will be a welcome "bonus," even if the refrigeration content of the $N_2$ is not fully recovered by the secondary working fluid loop.

With reference to FIG. 4, exemplary systems and methods of power release and cold recovery using $O_2/N_2$ as the power storage medium 412 will now be described. An exemplary $O_2/N_2$ release system 401 would include the same or similar components and configuration as the L-Air system described above in connection with FIG. 3. For instance, the system comprises cryogenic storage vessel 404 with a pump 402 driven by motor M fluidly connected thereto, a plurality of heat exchangers 406a-406f in fluid connection with the pump 402 and the storage tank 404, and at least one expander 408, which may include a plurality of expanders 408a-408d, fluidly connected to at least one of the heat exchangers 406a-406f. Exemplary embodiments would also utilize a prime mover assembly 403, e.g., a GT array including GT and generator 400, to produce a portion of the outflow power 429 and as the heat source to warm the working fluid loops (e.g., air and $CO_2$); the primary $O_2/N_2$ loop 410; the secondary (cold recovery) working fluid loop 420. Aside from the use of $O_2/N_2$ as the power storage medium and the differences mentioned below, the other components, loops, and streams 412, 413, 414, 416, 418, 420, 422, 424, 426, 428, 430 are analogous to the corresponding items designated by the 300 series in FIG. 3. Generators 400 are shown in three locations, loading the GT 403, the air expanders 408b and 408c and loading the working fluid expander 408c. Power output 429 occurs at all three of those locations.

One variation when using $O_2/N_2$ as the power storage medium 412 is that the intake air 413 to the GT array 403 is ambient air that is cooled in heat exchanger 406b by the remaining low-grade refrigeration in the $O_2/N_2$, and exemplary systems and methods further comprise a methanol infusion system 460. The methanol infusion system 460 provides methanol 461 (or other suitable and combustible anti-freeze) from tank 464, which is pumped to appropriate pressure by pump 466 and infused to the inlet air via a spray valve 462 to keep the water content in the inlet air from freezing. The methanol infusion step would occur at/near point A, prior to the air's entry into heat exchanger 406b. The methanol (or other combustible anti-freeze) would be replenished periodically, as needed.

As discussed above, power release systems and methods achieve an optimal cold- and heat-recovery balance during the power outflow mode and an optimal balance between the fuel used by the prime mover and the fluids used by the system, to convert stored mechanical energy into distributed power production. An exemplary embodiment of that balancing effort where the prime mover is a GT and the power storage medium is liquid $O_2/N_2$ is as follows. First, the flow rate of the stored power storage medium 412, liquid $O_2/N_2$, is matched to the inlet air flow rate of the GT array 403 such that the outflowing $O_2/N_2$ 412 will cool the entire ambient inlet air 413 to the GT down to approximately $-4°$ F. The infusion rate of the methanol 461 used to prevent freezing of the cooled inlet air 413 is matched to the flow rate of the inlet air stream 413 and to its water content.

The refrigeration content of the stored $O_2/N_2$ 412 is also matched with the refrigeration needed to condense/liquefy the working fluid closed loop 416 that serves to re-use the available refrigeration in the stored $O_2/N_2$ 412 to condense the working fluid 414, allowing it to be pumped to pressure, warmed and expanded in a generator-loaded expander. A portion of the heat content from the GT's approximately $1,000°$ F. exhaust is allocated to the pumped-to-pressure $O_2/N_2$ so that the stored energy in the $O_2/N_2$ can be most effectively released. The remainder of the GT's hot exhaust heat content is allocated to the pumped-to-pressure working fluid, whose flow rate matches the flow rates of the $O_2/N_2$ and GT exhaust gas. In the event that the available heat from the GT exhaust is not quite enough, an NG-fired afterburner 427 (or a direct-fired heater) may be provided to the GT hot exhaust 416, to reheat that exhaust at an optimum point in the system, in order to produce enough heat to match the L-Air and working fluid flow rates.

It should be noted that this exemplary balancing process can be modified if the power output mode is located at an air separation plant, along with the power storage (liquid $O_2/N_2$) production mode. In that event, the process can be simplified, eliminating the working fluid loop, and allowing any remaining refrigeration in the outbound $O_2/N_2$ stream to be used by the air separation plant to produce more liquid air and more of the higher-value liquid $O_2/N_2$ that is sold to the market. That simplification will reduce the capital costs of the power outflow mode, simplify its operation, and allow for the proper matching of available heat and cold so that no useful energy is thrown away. Also, the balancing can be achieved by using any remaining cold in the outbound storage medium to produce LNG/CCNG.

FIG. 5 illustrates another variation where an NG-fired engine 500 replaces the GT 403. In exemplary embodiments, heat of about $1,000°$ F. for outflow mode may be provided by burning of fossil fuel such as natural gas. Other similar fuels, such as anaerobic digester gas, or landfill gas, or other biogases can also be used. With an NG-fired engine as the prime mover, the engine will also benefit from chilled inlet air. The waste heat flow from the engine (including by use of an afterburner or supplemental heater) can be calibrated against the outflow rate of the stored L-Air (or liquid $O_2/N_2$) and the cold recovery achieved by the working fluid loop. The refrigeration content of the storage medium could be matched to the condensation required by an appropriate flow rate of the working fluid in its loop, where both of those streams are heated to about $1,000°$ F., which is an optimal temperature for expanding those previously pumped-to-pressure fluids in generator-loaded hot gas expanders. The cold content of the outbound cryogenic storage fluid 512 is recovered in heat exchanger 506b where the inlet air 513 to the engine is pre-cooled to approximately $34°$ F., avoiding the freezing of the water content of the air.

An exemplary $O_2/N_2$ release system 501 would include the same or similar components and configuration as the L-Air system described above in connection with FIG. 4. For instance, the system comprises cryogenic storage vessel 504 with a pump 502 driven by motor M fluidly connected thereto, a plurality of heat exchangers 506a-506f in fluid connection with the pump 502 and the storage tank 504, and at least one expander 508, which may include a plurality of expanders 508a-508d, fluidly connected to at least one of the heat exchangers 506a-506f. Exemplary embodiments would also utilize a prime mover assembly 503, e.g., in this case including NG-fired engine 505, to produce a portion of the outflow power 529 and as the heat source to warm the working fluid loops (e.g., air, $CO_2$ or other fluids mentioned above); the primary $O_2/N_2$ loop 512; the secondary (cold recovery) working fluid loop 520. Aside from the use of an NG-fired engine instead of a GT and the differences mentioned below, the other components, loops, and streams 512, 513, 514, 516, 518, 520, 522, 524, 526, 528, 530 are analogous to the corresponding items designed by the 400 series in FIG. 4. Generators 500 are shown in three locations, loading the engine 503, the air expanders 508a and 508b and loading the working fluid expander 508c. Power output 529 may occur at all three of those locations.

This embodiment may include an "after-burner" or a supplemental heater (not shown), which would raise the temperature of the engine's exhaust to about $1,100°$ F., providing the optimal-grade heat to the system. In this exemplary embodiment, the cryogenic storage medium (L-Air or $O_2$ or $N_2$) 512 would not be sent to the engine 500 but would be vented to the atmosphere as a harmless outflow stream.

However, the cold content of the power storage medium 512 and the working fluid stream 514 are used to cool the inlet air 513 to the NG-fired engine 505, providing the engine 505 with denser air (containing more oxygen per volume), and allowing the engine to perform better, in a steady manner during all seasons. To the extent that the cold content of the outbound cryogenic power storage medium 512 and the working fluid 514 (traveling in its closed loop) exceeds the refrigeration that can be applied to the inlet air 513, any surplus refrigeration may be used in an adjacent process, such as food processing, or for summer cooling of a building or for LNG/CCNG production. Additional uses for such surplus refrigeration may include the cooling of the generators that load the engine and the expanders, improving the efficiency of the generators. FIG. 5 does not show those cold recovery options, which are well understood by process engineers.

In exemplary embodiments, an approximately 5 MW/40 MWH VPS design could use a 1 MW natural-gas-fired engine as the prime mover instead of the GT. As in the above example that used a GT and was scaled at about 14.4 MW/115 MWH, the amount and grade of the waste heat produced by the engine could be matched to the amount of stored L-Air (or $O_2/N_2$ available at an air separation plant) and to the working fluid flow rate in the second loop. The total heat available from the 1 MW engine, the lower-grade of that heat, and the fact that the waste heat is split between the engine's water jacket and its exhaust stack, suggests that an afterburner may be useful in attaining the optimal amount and grade of heat (around 1,000° F.) from the engine.

At this scale, a stand-alone inflow-to-storage and outflow-from-storage facility could contain several reciprocating compressors for dealing with the inlet air, all on a single skid, with a second skid containing the gas-fired engine, a third skid containing the mechanical chiller and heat exchangers, and a fourth skid containing the hot gas expanders. Such a 4-skid configuration would be the "appliance scale" version of the present embodiments, where the inflow and outflow modes of the present invention were at the same location. That scale would allow for a "factory-built" configuration (rather than field constructed), allowing a single (or several, pre-engineered design(s) to be widely deployed. Furthermore, for those customers that only need about 3-4 MW (24-31 MWH) of power output, the pre-engineered VPS "appliance" would still be a viable deployment option because any surplus power output from the appliance, above and beyond the host customer's needs, could be sold to other customers on the same electric grid that delivered the off-peak power to the appliance.

Figure 6:
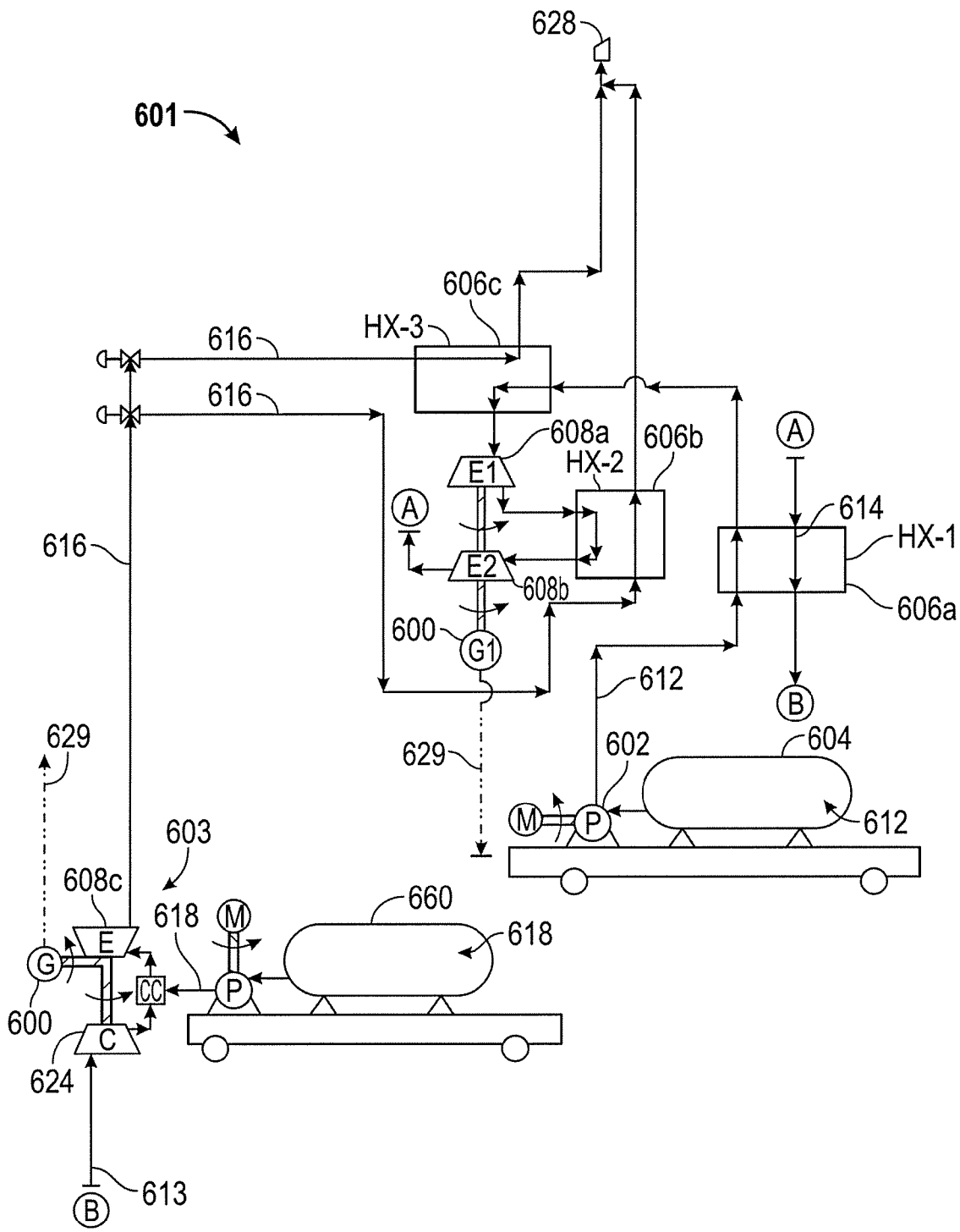
FIG. 6 is a box diagram of an exemplary embodiment of a mobile power release and cold recovery system in accordance with the present disclosure.

Turning to FIG. 6, another exemplary embodiment of a power release and cold recovery system 601 could be a mobile (rather than stationary) deployment of the power outflow mode for vehicle propulsion, where the pumped to pressure power storage medium 612, e.g., liquid nitrogen or liquid air, is heated by waste heat 616 from an LNG fueled, electricity-producing locomotive's (or ship's or other vehicle's) turbine 603. (We envision a GT because it is generally lighter and requires less maintenance than engines.) The LNG-fueled GT 603 could provide about 20% of the total output of the "combined cycle" power plant, with the remaining 80% derived from the mechanical energy stored in a separate container of liquid air, where that energy would be released by the recovered hot products of combustion 616 that is produced by the GT 603, and where a portion of the refrigeration content of the power storage medium 612 is used to deeply chill the inlet air stream to the GT's front-end compressor 624, thus improving its performance. That configuration can be called a "hybrid-electric cycle," but where the GT does not drive the vehicle, but rather contributes electric power output (along with the hot, high-pressure air), where that combined electric output drives motors that drive the locomotive's wheels or the ship's propellers.

Such embodiments would include the same or similar components and configuration as the system described above in connection with FIG. 5. For instance, the system comprises cryogenic storage vessel 604 with a pump 602 fluidly connected thereto, a plurality of heat exchangers 606a-406c in fluid connection with the pump 602 and the storage tank 604, and at least one expander 608, which may include a plurality of expanders 608a-608c, fluidly connected to at least one of the heat exchangers 606a-406c. Aside from the use of a locomotive or ship turbine, and the differences mentioned herein, the other components, loops, and streams 612, 614, 616, 624, 628, are analogous to the corresponding items designed by the 500 series in FIG. 5. Generators 600 are shown in two locations, loading the GT 603, and the expanders 608a and 608b. Power output 629 occurs at those two locations.

The locomotive (or other vehicle) could be served by one or more LNG "tenders" 660 (tank cars) and by one or more L-Air tenders 604. The production of LNG and L-Air could occur along the rail line (or other transportation route), using NG pipelines along the rail line as the feed gas for the LNG 618 and ambient air as the feed for the integrated L-Air plant. (The equipment and general principles of LNG and L-Air production are similar and can be integrated symbiotically.) Such a combined LNG and L-Air plant could use "wheeled" renewable power during its nighttime operations, per the inflow-to-storage mode of the present disclosure. Each such plant could be a fully functioning distributed power storage and distributed power generation facility. However, instead of sending peak power out on the grid, the peak period power output would allow the plant to operate off-grid during the daytime. Moreover, the plant's two products, LNG 618 and L-Air 612 would constitute "transportable," stored mechanical energy assets. In the case of the LNG, the energy content is mostly in the potential release of the BTU content of the NG as it undergoes the chemical changes associated with combustion. In the case of the L-Air, the stored energy is released in a mechanical manner as the pumped-to-pressure power storage medium 612, e.g., L-Air, is vaporized, heated and expanded in a generator-loaded hot gas expander 608a, 608b.

Multiples of such plants (operating as power storage and power generation facilities 601) can serve multiple locomotives, each of which becomes part of the distributed power production network. Of course, similar embodiments can be applied to ships, where the LNG and L-Air plant is located at ports. Beyond that, there is potential to use this embodiment for heavy-duty mining equipment, and for trucks, buses, or other vehicles, especially if they are part of a fleet that returns to a base depot for daily fueling, where both LNG and L-Air are available.

Though Commercial-Scale VPS plants can be deployed at virtually any large industrial facility, among the "lowest-hanging fruit" are air separation plants that operate 24/7, have on-site L-Air production equipment, and could consume a large portion of the above exemplified embodiment where 14.4 MW/115 MWH of power is produced. The entire inflow mode (producing L-Air) already exists at each air separation plant, mostly eliminating the VPS inflow-to-storage equipment, thus reducing the complexity, capital cost and the footprint of each VPS deployment.

Moreover, many air separation plants have an imbalance between their liquid $O_2$ and $N_2$ production rates, because they are often located at "host" sites that want only one of those products, not both. Disclosed embodiments can utilize stored liquid $O_2$ or liquid $N_2$ (instead of L-Air), where the stored (low-value) cryogenic liquid could be sent through the outflow-from-storage mode outlined above, but without being sent to the GT. Instead, any remaining refrigeration in the $O_2$ or $N_2$ is used to cool the inlet air to the GT, after which the $O_2/N_2$ is vented at ambient temperature and pressure, making room for more $O_2/N_2$ storage during the next nighttime off-peak period. (Of course, the venting of clean $O_2/N_2$ is not an emissions issue.)

A further optimization that is likely deployable at air separation plants, would simplify the outflow mode to just the GT and an open loop hot air (or $O_2/N_2$) expansion cycle, without the secondary working fluid loop. The flow rate of the stored L-Air/$O_2/N_2$ could be matched to the available heat from the GT, and the air separation process functioning adjacent to the VPS deployment could recover any excess refrigeration available from the pumped-to-pressure L-Air/$O_2/N_2$. That optimization would be the least complex, least costly, and yield the smallest possible footprint, and can very efficiently yield well above 10 MW/80 MWH of total power output with a single GT unit and a single (two-stage-with-reheat) generator-loaded hot gas expander.

The configuration outlined above (where semi-centrally produced liquid $O_2$ or $N_2$ is received by a decentralized power generation network) can be installed at numerous off-site customer locations, say, within a 100-mile radius of any air separation plant. In such embodiments, each customer's storage tank and outflow equipment would receive daily $O_2/N_2$ deliveries from a semi-central air separation plant, thus avoiding about 35% of the capital cost of a fully independent VPS Cycle plant at each customer's site. The semi-centralized air separation plant would, in effect, be the utility-scale "power storage" facility, producing bulk-scale $O_2/N_2$, while the satellite sites, with only cryogenic storage and VPS outflow mode equipment, would constitute a commercial-scale network of distributed power generation/power release sites. The delivered price of the $O_2/N_2$ would typically need to be competitive with the cost of L-Air produced by each customer if each one would have installed its own VPS inflow-to-storage facility and used that equipment with off-peak power purchased from the grid. That competitive price structure can likely be attained because of the economies of scale at the air separation plant and because the $O_2$ or $N_2$ that is the storage medium is the lowest-value product of the air separation plant.

Further to the role of air separation plants, deployments of disclosed embodiments at any air separation plant could cause that facility to operate as an ESCO, opening up an entirely new business opportunity to the air separation industry. At the simplest level, each air separation plant would utilize the systems and methods of the present embodiments to receive and store off-peak power and to release that power during the daytime peak demand period, allowing it to be entirely off the grid during the daytime. In that model, the air separation plan would be acting as an ESCO for itself, and possibly selling surplus power to the grid. When an air separation plant is located at a "host" site, such as a steel mill or glass manufacturing facility, to which it provides, for example, $O_2$, it can now be the ESCO to that host entity as well as to itself.

In the semi-centralized models outlined herein, the air separation plant can act as the ESCO for the several power-outflow (distributed power production) sites that it would be supplying with $O_2/N_2$, except that in that case the ESCO would not be selling power but selling stored energy in the form of a cryogenic fluid. In the context of the products and services provided by air separation plants, the ESCO role may be as important as the current (standard) products. As such, the ESCO role may stimulate new air separation plant deployment (business growth), where the standard products/services ($O_2$, $N_2$, $CO_2$, argon . . . ) are lucrative "byproducts" of the ESCO function.

In all of the embodiments discussed herein, the prime mover can continue to generate power (e.g., 1 MW from a single GT or 1 MW from a single engine) at the VPS distributed generation facility even if the grid is "down" for hours/days/weeks/months, and no new L-Air (or $O_2/N_2$) can be produced, stored or delivered. As long as the NG pipeline system is intact, each VPS plant could have about 10% to 20% of its rated power outflow capacity available as back-up generation. Thus, disclosed embodiments are not only distributed power storage and distributed power generation methods and systems, they are also methods for providing backup power to the host site, allowing disclosed embodiments to replace diesel generators (and their fuel tanks) and other types of backup power, and allowing that rarely used backup capacity to have a full time (daily) purpose.

Moreover, some "mission-critical" facilities that have a very low tolerance for power outages, such as military bases, hospitals and data centers, may opt for "extra" on-site $N_2$ (or L-Air or $O_2$) storage, allowing them to continue to produce power, at the full capacity of the VPS deployment, as long as the NG pipeline is not disrupted and for as many hours as the stored $N_2$ (or L-Air or $O_2$) allows. Many military bases rely on $N_2$ as the gas that fills tires on trucks and airplanes, because, unlike air, $N_2$ contains no oxygen and does not support fires. Disclosed embodiments allow such on-site $N_2$ plants (or $N_2$ storage tanks, if the $N_2$ is delivered from off-site producers) to be integrated into a comprehensive distributed power storage, distributed power production, and emergency back up power system.

The distributed power production embodiments discussed throughout the present disclosure are not only a supplement to centralized power production, but also an alternative to it. Exemplary embodiments offer an entirely new model for the production and distribution of power, substantially eliminating the need for "big" power plants (with 100s of MW of power output capacity) and allowing for a substantially reimagined grid.

For reasons related to air emissions and ash treatment and the associated costs of mitigating those impacts of coal-fired power plants, there are not likely to be any new coal-fired power plants built in the US or in Europe. Thus, the options for building new "big" power plants (with 100s of MW of capacity) that use a low-cost fuel (coal) will be significantly reduced. The low-cost of coal is due in large measure to the fact that the externalities of its emissions are not "paid for" by coal-fired generators and to how it is removed from the earth. If those costs were reflected in its price, it would not necessarily be the lowest-cost fossil fuel.

The possibility of substituting nuclear power plants for coal fired ones is remote because of public resistance to nuclear plants, their expense, and the long lead-time required and the absence of viable nuclear waste disposal system. Small-scale nuclear power plants are in development, but their acceptance by the public is not assured and their cost-effectiveness has not yet been demonstrated. Building new nuclear power plants once held the promise of zero air emissions (and no ash production), but the issues related to nuclear waste disposal and "perceived" (or real) questions surrounding safety have not been solved.

Most observers will point to NG-fired combined cycle power plants as the only viable alternative to meeting long-term power demand (especially baseload demand) in the US and Europe. Such plants offer the cleanest fossil fuel option and rely on a relatively low cost fuel. However, big combined cycle power plants need to be located on regional NG pipelines that can deliver the required amount of fuel, and near large quantities of readily available, low-cost water to feed the cooling towers and the steam side of the cycle. Their cost, at hundreds of millions of dollars, requires a large customer base (prior to construction), and access to a large amount of capital.

When accounting for the site selection, permitting process, the need to obtain capital commitments, and the need to construct each combined cycle power plant as a "one-off" with long lead times for highly specialized equipment, the time between a proposed deployment and the plant's start up and commissioning can take many years. Despite their scale, big combined cycle power plants, including the largest, newest ones, with the most sophisticated components, do not achieve efficiencies higher than approximately 60%. In addition to the above, large-scale, centralized combined cycle power plants require large-scale, complex, long-distance power transmission systems, which also take years to permit and construct (if they get permitted at all). Both the centralized power plants and the long-distance transmission systems are vulnerable to natural and man-made events.

In summary, such big combined cycle power plants are almost always far from their customers, use large quantities of precious water, require very large investments of capital and time, typically must "pre-sell" their power to a large customer base, offer not especially high efficiencies, considering their scale, and (along with the complex grid that connects them to their large customer base) are vulnerable to unplanned events and disasters.

The growth of renewable power generation (such as from wind turbines) is a significant and commendable trend for various reasons, including the ability to avoid emissions, avoid radioactive waste, and avoid the entire process associated with finding fuel sources, recovering the fuel, processing it, transporting it and storing it. However, the growth of the renewable power sector is not fast enough to keep up with worldwide power demand and the intermittency of most renewable power is a significant limitation. In short, if the renewable power sector is to grow to its full potential, power storage must grow with it. The inventor's prior patents in this realm may help, as will the present disclosure.

Most landfill sites produce landfill gas (LFG) that, after rudimentary cleaning, can be burned in engines (or turbines) to produce electricity. This approach is in lieu of flaring of LFG, thus converting a "renewable resource" (trash) into energy. However, the value of nighttime power from such LFG-to-kW deployments is lower than the daytime value. Embodiments of the present disclosure allow that nighttime power to be converted to stored L-Air (or other cryogenic fluid), which would be released as extra power during the daytime, where the waste heat from the existing engine (or turbine) would drive the power outflow mode. A similar arrangement can be integrated with anaerobic digester facilities. Instead of flaring the digester gas, the present disclosure will allow that gas to be used as a nighttime fuel for the production of L-Air, and as a daytime heat source for the release of the stored L-Air.

Embodiments of the present disclosure allow many small distributed power production facilities to be deployed on almost any NG pipeline; close to their customers; requiring very little (if any) water; requiring smaller investments of capital and time to deploy; without requiring a large customer base that needs to be contracted prior to deployment; achieving approximately the same efficiency as much large combined cycle power plants; and reducing the "vulnerability" of the entire power production and distribution system.

Moreover, each deployment of embodiments of the present disclosure, whether as a stand-alone power storage and power production facility, or as part of the semi-centralized storage model outlined above, will allow for "receiving" off-peak renewable energy from sources such as wind farms. That feature will facilitate a more widespread deployment of renewable power production sources, allowing them to be better integrated with the power grid by delivering baseload, dispatchable power to consumers of electricity. At the same time, the growth of the renewable power sector will enhance the need for the present embodiments.

New York City's (NYC) daily power demand is among the largest in the US when measured by the geographic size of the City. At the same time, the ability to provide in-City power generation plants is severely limited for many reasons, including the need to avoid new "point source" emissions. The construction of new high-capacity cables from outside the City is equally challenging and very expensive. In the absence of new in-City power generation and/or the construction or upgrading of the grid that delivers power to the City, the City will experience power demand that exceeds the capacity of the grid, especially during summer.

Exemplary embodiments of the present disclosure offer several plausible responses (for NYC and elsewhere, globally). Peaker Plants: NYC and nearby Long Island host a number of simple cycle 40 MW peaker GTs, which were installed to alleviate a shortage of available power during peak demand periods. Each one of those sites is suitable for enhancement, where the cryogenic $N_2$ (or $O_2$ or L-Air) tank(s) would be deployed along with the remainder of the VPS outflow mode equipment, but without the inflow-to-storage equipment. The $N_2$ used in such an upgrade would arrive on a daily or semi-weekly basis, preferably at night to avoid traffic issues. A single air separation plant in or near NYC (or Long Island) would service several such distributed VPS deployments. In this context, with sites that do not have a lot of room for new equipment, and where the economic value of the newly produced power is quite high, embodiments may not need to include the working fluid loop. Instead the cold content of the $N_2$ would only be used to pre-cool the inlet air to the GT. Such a simplified design may be less efficient than the one that includes the working fluid cold recovery loop, but it may be the preferred choice given space limitations for deployment, or where reduced capital cost is more important than operating efficiencies.

Con Edison Steam System: Exemplary embodiments allow the grade of heat available to be adjusted by using supplemental heat. In the context of NYC, where new "point source" emission permits are difficult to obtain, such a supplemental heater would be installed in tandem with some (on-going) reduction of steam generation in Con Edison's existing City-wide "district heating" system. In other words, Con Edison's declining steam customer base would allow it to switch a portion of its annual fuel use from steam production to the supplemental heating of the working fluids used in the present embodiments, resulting in no new emissions. By relying on an off-site (semi-centralized) air separation plant for the daily deliveries of $N_2$, each deployment would avoid the need to build the front-end, inflow-to-storage equipment, reducing the footprint of the deployment and reducing its complexity at the "customer's" site. In summary, the present embodiments, when deployed in two distinct segments (centralized power storage and de-centralized power release), will allow Con Edison's steam generating facilities to have a newly productive mission, and allow, for the first time in many years, for NYC to deploy new power production equipment within the City limits (with no new emissions).

In-City air separation plants: Per the above, NYC and nearby Long Island and Westchester would now be ripe for newly constructed air separation plants. Those plants would not only serve the various decentralized (distributed generation) power production sites, but would also provide liquid oxygen to the large health care market (and other $O_2$ markets) in the NYC region. The closer those new air separation plants can be located to the various VPS power generation sites, the lower the transportation costs of the cryogenic fluid from the semi-centralized plant(s). As mentioned above, the integration of LNG production with L-$N_2$ production is a relatively simple matter. In the context of New York (outside of NYC) an air separation plant that produced L-$N_2$ for use at nearby VPS outflow-from-storage deployments could also produce LNG. That LNG could be used to fuel the trucks that deliver the L-$N_2$. Of course, the air separation plant itself could also be a VPS outflow-deployment site, using stored $N_2/O_2$ produced the night before as its working fluid during the peak daytime period when the plant could go off the grid (in whole or in part).

Organic Rankine Cycle (ORC) systems convert waste heat to energy in a cycle that is analogous to the steam portion of a combined cycle power plant and to the outflow mode of the present embodiments. However, most commercially available ORC systems require relatively high-grade heat (above 300° F.) to operate. Moreover, even when the grade of heat is above 600° F. (as preferred by some ORC systems) the efficiency of ORC systems tends to be relatively low, ranging from about 12% to 20%, depending on the grade of heat available.

Exemplary embodiments offer an alternative approach to recovering waste heat and using it to produce power. Instead of the ORC equipment, exemplary embodiments could deploy the outflow mode of the VPS cycle where $O_2/N_2$ would be delivered from a semi-centralized air separation plant, and where the on-site, low-grade, waste heat would be used to pre-warm the $O_2/N_2$ stream prior to receiving high-grade heat from the VPS unit's GT or NG-fired engine. That integration would allow a smaller GT (or engine) to service a larger flow of $O_2/N_2$, reducing the relative amount of NG burned in the system. The low-grade waste heat that is available at the host site would be the first heat source applied to the outbound $O_2/N_2$, warming the working fluid (WF) to within 10-degrees of the temperature of the waste heat source, and then warming the WF toward the 1,000° F. that is the optimal pre-expansion temperature for the $O_2/N_2$.

Thus, the deployment outlined above would allow the available waste heat at an industrial site to be used in a manner that can supply enough power to remove (all or a substantial portion of) that facility from the grid during the daily peak power demand period. Instead of an ORC solution that inefficiently converts the site's waste heat to a small portion of the site's daily peak power demand, and does so with costly equipment, exemplary embodiments allow that site to be fully independent from the power grid during peak periods, where that independence is partially "fueled" by the available waste heat.

Round-trip efficiency (the ratio of the amount of power used to create the cryogenic fluid (inflow-to-storage mode) to the amount of power released (outflow-from-storage mode)) for exemplary embodiments can be calculated by using the following methodology (with exemplary numbers). All of the disclosed embodiments yield high round-trip efficiency (RTE) rates. An exemplary RTE calculation is as follows.
VPS ROUND-TRIP EFFICIENCY (RTE) Methodology
Base Case Assumptions
Storage: 225,000 gallons of L-Air=1,368,800 pounds of L-Air=3 tanks, 75,000 gallons each
Assumptions
Storage: 225,000 gallons of L-Air=1,368,800 pounds of L-Air=3 tanks, 75,000 gallons each
Inflow to Storage: 10 hours per day times 5 days per week times 52.14 weeks per year
Outflow from Storage: 8 hours per day times 5 days per week times 52.14 weeks per year
Energy Flow
Inflow-to-Storage: 16.21 MW×10 hours=162.1 MWH/day; 42,288 MWH/year
Net Outflow-from-Storage: 48.05 MW×8 hours=384.4 MWH/day; 100,211 MWH/year
Natural Gas (NG) Used During Outflow: 177,005 SCF/hr; 161,959,575 BTU/hr
Heat Rate of VPS Cycle: 3,371 BTU/kWH
Lower Heating Value (LHV) Energy Content of NG: 915 BTU/SCF (approximate)
Power Output Content of NG Used
MWH of power if NG is used in a highly efficient (60%) Combined-Cycle Power Plant (i.e., the amount of power output that could be achieved with the same amount of NG by a high-efficiency power generation sytem): 59,804 MWH/year
Portion of Energy Output Attributable to Stored Energy
Total Power Output–Power Output Attributable to NG=Energy Recovered from Storage: 100,211 MWH–59,804 MWH=40,408 MWH
RTE=Recovered Output÷ Inflow-to-Storage
40,408÷42,288=95.55%

In other words, of the 42,288 MWH of inflow-to-storage, 40,408 MWH are recovered, yielding a 95.55% recovery rate or Round-trip Efficiency (RTE). That relatively high RTE can be achieved with the relatively high-grade heat available for GTs and some engine configurations. Lower grade heat (say, at about 800° F.) will yield RTE rates closer to about 82%. However, in some contexts that RTE is an excellent result, considering the power storage and power production values that are generated by the present embodiments. In other contexts, where a high RTE (say, 90% or higher) is essential for economic viability, or where recoverable waste heat is only available at a lower grade, various supplemental heating steps can be introduced, as mentioned throughout this document. It should be noted that the above RTE calculation is only exemplary and not in any way a limitation on the embodiments disclosed and claimed herein.

Thus, it is seen that systems and methods of semi-centralized power storage and distributed power generation and power release and cold recovery are provided. It should be understood that any of the foregoing configurations and specialized components may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A system of semi-centralized energy storage and distributed power generation, comprising:
at least one energy storage facility receiving energy via an electric grid, the energy being generated at a first location, the energy storage facility being at a second location different from the first location, the second location being closer to end users of the energy than the first location;
the energy storage facility producing an energy storage medium at the second location and storing the energy from the first location at the second location in the energy storage medium, the energy storage medium comprising: liquid air, liquid oxygen, liquid nitrogen, or a combination thereof;
at least one mobile stored energy transportation unit configured to carry at least a portion of the energy storage medium to a distributed power generation facility at a third location different from the first and second locations, the third location being closer to end users of the energy than the first location; and
a prime mover fluidly connected to the distributed power generation facility, wherein the energy storage medium cools an inlet air stream to the prime mover.

2. The system of claim 1 wherein the energy storage facility is an air separation plant.

3. The system of claim 1 wherein the energy storage facility functions as an energy service company.

4. The system of claim 1 wherein the distributed power generation facility is electrically connected to an electric grid and provides power to the grid.

5. The system of claim 1 wherein the energy storage facility is configured to use a portion of the stored energy in a distributed power generation mode.

6. The system of claim 1 further comprising a natural gas pipeline fluidly connected to the distributed power generation facility.

7. The system of claim 1 wherein the power storage facility comprises:
- a plurality of compressors;
- at least one heat exchanger fluidly connected to at least one of the compressors;
- at least one expander fluidly connected to at least one of the compressors;
- a mechanical chiller fluidly connected to the expander; and
- a storage vessel fluidly connected to the expander.

8. The system of claim 1 wherein the distributed power generation facility comprises:
- a plurality of heat exchangers;
- at least one expander fluidly connected to at least one of the heat exchangers; and
- a prime mover assembly including a prime mover, the prime mover assembly fluidly connected to at least one of the heat exchangers.

9. The system of claim 1 wherein the prime mover is a fueled turbine, and wherein the turbine provides a portion of power supplied by the distributed power generation facility.

10. The system of claim 1 wherein the prime mover is a fueled turbine.

11. The system of claim 1 wherein the system is a commercial scale deployment.

12. The system of claim 1 further comprising at least one energy storage facility at a fourth location different than the second location, wherein at least one mobile stored energy transportation unit transports energy storage medium from the fourth location to the distributed power generation facility.

13. The system of claim 1 wherein the at least one mobile stored energy transportation unit carries at least a portion of the energy storage medium off-grid to the distributed power generation facility.

14. The system of claim 1 wherein the prime mover functions as a back-up generator.

15. The system of claim 1 wherein at least one distributed power generation facility sends power back to the energy storage facility.

16. A method of semi-centrally storing energy and distributing power, comprising:
- receiving energy from a first location, the energy being received by an energy storage facility at a second location different from the first location, the second location being closer to end users of the energy than the first location;
- producing an energy storage medium at the second location and storing the energy at the second location in the energy storage medium, the energy storage medium comprising: liquid air, liquid oxygen, liquid nitrogen, or a combination thereof;
- transporting at least a portion of the energy storage medium to a third location different than the first and second locations, the third location being closer to end users of the energy than the first location;
- releasing energy from the energy storage medium to generate power via a distributed power generation facility located at the third location; and
- providing a portion of outflow power from a prime mover located at the third location, the prime mover being fluidly connected to the distributed power generation facility.

17. The method of claim 16 wherein storing energy comprises separating air into liquid oxygen, liquid nitrogen, or a combination thereof.

18. The method of claim 17 further comprising storing at least a portion of the energy in the energy storage medium as back-up power.

19. The method of claim 16 wherein generating power comprises providing power to an electric grid.

20. The method of claim 16 wherein a portion of the stored energy is used at the second location.

21. The method of claim 16 further comprising providing natural gas at the third location.

22. The method of claim 16 wherein storing power comprises providing a stream of side load refrigerant to cool the power storage medium.

23. The method of claim 16 wherein releasing power comprises:
- pumping to pressure the power storage medium;
- directing a working fluid in counterflow to the power storage medium such that the working fluid warms the power storage medium and the power storage medium condenses the working fluid;
- directing one or more gaseous products of combustion in counterflow to the power storage medium such that the gaseous products warm the power storage medium and the working fluid; and
- expanding the power storage medium and the working fluid in generator-loaded expanders.

24. An integrated electric grid, fuel source, and surface transport system, comprising:
- at least one energy storage facility receiving energy via an electric grid, the energy being generated at a first location, the energy storage facility being at a second location different from the first location, the second location being closer to end users of the energy than the first location;
- the energy storage facility producing an energy storage medium at the second location and storing the energy from the first location at the second location in the energy storage medium, the energy storage medium comprising: liquid air, liquid oxygen, liquid nitrogen, or a combination thereof;
- at least one mobile stored energy transportation unit configured to carry at least a portion of the energy storage medium to a distributed power generation facility via surface transport systems, the distributed power generation facility being at a third location different from the first and second locations, the third location being closer to end users of the energy than the first location; and
- a fuel source and a prime mover fluidly connected to the distributed power generation facility, the prime mover providing a portion of outflow power supplied by the distributed power generation facility.

25. The system of claim 24 wherein the energy storage facility is an air separation plant.

26. The system of claim 24 wherein the energy storage facility is configured to use a portion of the stored energy in a distributed power generation mode.

27. A method of distributing energy, comprising:
- receiving energy from a first location via an electric grid, the energy being received at an energy storage facility at a second location different from the first location, the second location being closer to end users of the energy than the first location;
- producing an energy storage medium at the second location, storing energy at the second location in the energy storage medium, and transporting energy from the second location to a third location in an energy storage medium via a mode of transportation independent of an electricity grid, the third location being different than the first and second locations and being closer to end users of the energy than the first location; and
- using a portion of the energy storage medium to cool an inlet air stream to a prime mover located at the third location, the prime mover being fluidly connected to a distributed power generation facility located at the third location.

* * * * *